US012808801B2

(12) United States Patent
Umetsu et al.

(10) Patent No.: US 12,808,801 B2
(45) Date of Patent: Nov. 24, 2026

(54) INFORMATION PROCESSING DEVICE, INFORMATION PROCESSING METHOD, AND OPTICAL MEASUREMENT SYSTEM

(71) Applicant: SONY GROUP CORPORATION, Tokyo (JP)

(72) Inventors: Tomoyuki Umetsu, Tokyo (JP); Naoki Ide, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 1091 days.

(21) Appl. No.: 17/906,236

(22) PCT Filed: Mar. 23, 2021

(86) PCT No.: PCT/JP2021/012074
§ 371 (c)(1),
(2) Date: Sep. 13, 2022

(87) PCT Pub. No.: WO2021/200411
PCT Pub. Date: Oct. 7, 2021

(65) Prior Publication Data
US 2023/0120382 A1 Apr. 20, 2023

(30) Foreign Application Priority Data
Mar. 31, 2020 (JP) ................................ 2020-062166

(51) Int. Cl.
*G01N 21/64* (2006.01)

(52) U.S. Cl.
CPC ....... *G01N 21/645* (2013.01); *G01N 21/6428* (2013.01); *G01N 2021/6439* (2013.01); *G01N 2201/127* (2013.01)

(58) Field of Classification Search
CPC ............ G01N 21/645; G01N 21/6428; G01N 2021/6439; G01N 2201/127
See application file for complete search history.

(56) References Cited

U.S. PATENT DOCUMENTS 6,528,258 B1 * 3/2003 Russell .................... C12Q 1/68 435/6.15
6,584,413 B1 * 6/2003 Keenan ..................... G01J 3/28 702/194
(Continued)

FOREIGN PATENT DOCUMENTS

CN 102235976 A 11/2011
CN 102313724 A 1/2012
(Continued)

OTHER PUBLICATIONS

Zimmermann, Springer, 2005, pp. 245-265.*
(Continued)

*Primary Examiner* — Michael I Ezewoko
(74) *Attorney, Agent, or Firm* — CHIP LAW GROUP

(57) ABSTRACT

A suitable fluorescence separation method is set according to an object to be measured. An information processing device according to an embodiment includes a separation unit (14) that calculates, from a fluorescence signal measured from a biological sample labeled with one or more fluorescent dyes, fluorescence intensities of one or more fluorescent beams and an autofluorescent beam emitted from the one or more fluorescent dyes and the biological sample, respectively, by an arithmetic operation using a least squares method using a fluorescence spectrum reference of each of the fluorescent dyes and an autofluorescence spectrum of the biological sample. In the arithmetic operation using the least squares method, an upper limit value and a lower limit value of the fluorescence intensity are set for each of the one or more fluorescent beams and the autofluorescent beam.

10 Claims, 16 Drawing Sheets

(56) References Cited

U.S. PATENT DOCUMENTS

| | | | | |
|---|---|---|---|---|
| 6,618,140 | B2 * | 9/2003 | Frost | G01J 3/4406<br>250/459.1 |
| 6,662,116 | B2 * | 12/2003 | Brown | G01N 21/35<br>702/22 |
| 6,675,106 | B1 * | 1/2004 | Keenan | G01J 3/28<br>702/194 |
| 6,954,722 | B2 * | 10/2005 | Parks | G16B 45/00<br>702/194 |
| 7,254,343 | B2 * | 8/2007 | Gu | H04B 10/2507<br>398/155 |
| 7,400,772 | B1 * | 7/2008 | Keenan | H04N 19/48<br>375/240 |
| 7,594,429 | B2 * | 9/2009 | Liberatore | G01N 11/14<br>73/54.23 |
| 7,725,517 | B1 * | 5/2010 | Keenan | G01N 23/223<br>702/23 |
| 7,782,512 | B2 * | 8/2010 | Shinoda | G01N 15/1459<br>359/223.1 |
| 8,004,674 | B2 * | 8/2011 | Ball | G01J 3/4406<br>356/317 |
| 8,244,021 | B2 * | 8/2012 | Lett | G06F 3/04847<br>382/128 |
| 8,280,134 | B2 * | 10/2012 | Hoyt | G01N 1/30<br>382/128 |
| 8,731,860 | B2 * | 5/2014 | Charles | G01N 15/1012<br>356/243.2 |
| 8,906,309 | B2 * | 12/2014 | Krockenberger | G01N 15/00<br>422/50 |
| 8,990,024 | B2 * | 3/2015 | Kato | G01N 15/1429<br>702/19 |
| 8,999,654 | B2 * | 4/2015 | Gaitanaris | A01K 67/0278<br>436/501 |
| 9,025,145 | B2 * | 5/2015 | Thomas | G01N 15/1429<br>356/336 |
| 9,057,676 | B2 * | 6/2015 | Sharpe | G01N 15/1012 |
| 9,068,946 | B2 * | 6/2015 | Nitta | G01N 15/1429 |
| 9,128,055 | B2 * | 9/2015 | Sekino | G01N 21/6408 |
| 9,618,442 | B2 * | 4/2017 | Sharpe | G01N 15/1012 |
| 9,618,520 | B2 * | 4/2017 | Bergo | G01N 33/5014 |
| 9,714,900 | B2 * | 7/2017 | Haider | A61B 5/14539 |
| 9,779,213 | B2 * | 10/2017 | Donovan | G16H 50/50 |
| 9,833,144 | B2 * | 12/2017 | Kircher | A61B 5/0042 |
| 9,858,389 | B2 * | 1/2018 | Donovan | G16H 50/50 |
| 9,987,358 | B2 * | 6/2018 | Vo-Dinh | G01N 33/582 |
| 9,999,694 | B2 * | 6/2018 | Bradbury | A61K 49/0002 |
| 10,012,537 | B2 * | 7/2018 | Garsha | G01J 3/28 |
| 10,039,847 | B2 * | 8/2018 | Bradbury | A61K 49/0002 |
| 10,101,336 | B2 * | 10/2018 | Bergo | G01N 33/5014 |
| 10,197,493 | B2 * | 2/2019 | Sharpe | G01N 15/1012 |
| 10,241,045 | B2 * | 3/2019 | Baxter | B01F 23/41 |
| 10,274,414 | B2 * | 4/2019 | Sharpe | G01N 15/1012 |
| 10,292,374 | B2 * | 5/2019 | Gaitanaris | A01K 67/0278 |
| 10,371,639 | B2 * | 8/2019 | Sekino | G01N 15/1429 |
| 10,421,936 | B2 * | 9/2019 | Hansen | C12M 29/10 |
| 10,451,631 | B2 * | 10/2019 | Bergo | G01N 33/6851 |
| 10,526,600 | B2 * | 1/2020 | Baer | C40B 30/06 |
| 10,548,998 | B2 * | 2/2020 | Bradbury | A61K 49/0002 |
| 10,598,548 | B2 * | 3/2020 | Garsha | G02B 21/365 |
| 10,704,018 | B2 * | 7/2020 | Hansen | C12M 23/16 |
| 10,738,270 | B2 * | 8/2020 | Hansen | C12M 23/16 |
| 10,930,367 | B2 * | 2/2021 | Zhang | G16B 20/00 |
| 11,053,541 | B2 * | 7/2021 | Healy | C12N 15/1075 |
| 11,072,772 | B2 * | 7/2021 | Hansen | C12M 29/10 |
| 11,098,303 | B2 * | 8/2021 | Zhuang | C07H 21/02 |
| 11,131,622 | B2 * | 9/2021 | Umetsu | G01N 15/1012 |
| 11,131,674 | B2 * | 9/2021 | Bergo | G01N 33/5014 |
| 11,239,066 | B2 * | 2/2022 | Jones | A61B 1/041 |
| 11,282,688 | B2 * | 3/2022 | Takats | A61B 1/041 |
| 11,289,320 | B2 * | 3/2022 | Pringle | A61B 1/041 |
| 11,371,941 | B2 * | 6/2022 | Schütze | G01N 21/6458 |
| 11,419,955 | B2 * | 8/2022 | Bradbury | A61K 49/0002 |
| 11,566,941 | B2 * | 1/2023 | Garsha | G01J 3/2823 |
| 11,594,403 | B1 * | 2/2023 | Steingrimsson | G16H 50/20 |
| 11,644,395 | B2 * | 5/2023 | Hoyt | G01N 1/31<br>382/128 |
| 11,959,075 | B2 * | 4/2024 | Zhuang | C07H 21/02 |
| 11,988,592 | B2 * | 5/2024 | Halpert | G01N 15/1425 |
| 12,067,712 | B2 * | 8/2024 | Popescu | G06T 7/0012 |
| 12,104,151 | B2 * | 10/2024 | Zhuang | C07H 21/02 |
| 12,195,803 | B2 * | 1/2025 | Vogelstein | C12Q 1/6886 |
| 12,527,968 | B2 * | 1/2026 | Puleo | A61B 5/40 |
| 2007/0037135 | A1 * | 2/2007 | Barnes | G01N 21/51<br>356/73 |
| 2007/0193343 | A1 * | 8/2007 | Liberatore | G01N 11/14<br>702/100 |
| 2008/0212866 | A1 * | 9/2008 | Lett | G01N 21/6458<br>382/133 |
| 2009/0109436 | A1 * | 4/2009 | Shinoda | G01N 15/1012<br>356/337 |
| 2012/0010822 | A1 * | 1/2012 | Kato | G01N 15/1429<br>702/19 |
| 2013/0026391 | A1 * | 1/2013 | Sekino | G01N 21/6408<br>702/181 |
| 2013/0346023 | A1 * | 12/2013 | Novo | G01N 15/1429<br>702/179 |
| 2014/0323330 | A1 * | 10/2014 | Bergo | G01N 33/6851<br>506/18 |
| 2015/0253247 | A1 * | 9/2015 | Nitta | G01N 15/1429<br>250/564 |
| 2015/0301058 | A1 * | 10/2015 | Schettini | A61K 39/0011<br>424/193.1 |
| 2015/0369664 | A1 * | 12/2015 | Garsha | G01J 3/44<br>356/402 |
| 2017/0052170 | A1 * | 2/2017 | Shekdar | G01N 33/502 |
| 2017/0176453 | A1 * | 6/2017 | Bergo | G01N 33/5014 |
| 2017/0219601 | A1 * | 8/2017 | Bergo | G01N 33/54373 |
| 2017/0351837 | A1 * | 12/2017 | Donovan | G16H 50/50 |
| 2018/0057852 | A1 * | 3/2018 | Takats | A61B 1/041 |
| 2018/0059126 | A1 * | 3/2018 | Jones | A61B 1/041 |
| 2018/0073074 | A1 * | 3/2018 | Healy | G16B 30/20 |
| 2018/0093000 | A1 * | 4/2018 | Bradbury | A61K 49/0002 |
| 2018/0096742 | A1 * | 4/2018 | Donovan | G16H 50/30 |
| 2018/0103935 | A1 * | 4/2018 | Pringle | A61B 1/041 |
| 2018/0238901 | A1 * | 8/2018 | Schaaf | G01N 33/542 |
| 2018/0292260 | A1 * | 10/2018 | Garsha | G01J 3/44 |
| 2018/0326103 | A1 * | 11/2018 | Bradbury | A61K 49/0002 |
| 2019/0137383 | A1 * | 5/2019 | Umetsu | G01N 15/1012 |
| 2019/0226949 | A1 * | 7/2019 | Brooks | A61K 49/006 |
| 2019/0226994 | A1 * | 7/2019 | Schütze | G01N 21/65 |
| 2019/0256924 | A1 * | 8/2019 | Vogelstein | C12Q 1/6886 |
| 2019/0285611 | A1 * | 9/2019 | Lednev | G01N 21/3577 |
| 2019/0353663 | A9 * | 11/2019 | Schaaf | G01N 33/52 |
| 2020/0011877 | A1 * | 1/2020 | Bergo | G01N 33/54306 |
| 2020/0182772 | A1 * | 6/2020 | Umetsu | G01N 15/1429 |
| 2020/0209061 | A1 * | 7/2020 | Garsha | G06T 7/80 |
| 2021/0239707 | A1 * | 8/2021 | Loboda | C07K 1/13 |
| 2021/0255195 | A1 * | 8/2021 | Schaaf | G01N 33/542 |
| 2022/0033424 | A1 * | 2/2022 | Ahrens | C07F 15/025 |
| 2022/0076937 | A1 * | 3/2022 | Takáts | A61B 1/041 |
| 2022/0082488 | A1 * | 3/2022 | Jaimes | G01N 15/0205 |
| 2022/0082489 | A1 * | 3/2022 | Jaimes | G01N 15/0205 |
| 2022/0115222 | A1 * | 4/2022 | Jones | A61B 1/041 |
| 2022/0128570 | A1 * | 4/2022 | Bergo | G01N 33/6848 |
| 2022/0165558 | A1 * | 5/2022 | Pringle | A61B 1/041 |
| 2024/0371183 | A1 * | 11/2024 | Sörman | G06T 7/0012 |
| 2024/0371184 | A1 * | 11/2024 | Comiter | G06N 3/0475 |
| 2025/0066860 | A1 * | 2/2025 | Vogelstein | C12Q 1/6827 |

FOREIGN PATENT DOCUMENTS

| | | | |
|---|---|---|---|
| CN | 102410879 | A | 4/2012 |
| CN | 109596817 | A | 4/2019 |
| CN | 110088599 | A | 8/2019 |
| JP | 2011-206193 | A | 10/2011 |
| JP | 2012-018108 | A | 1/2012 |
| JP | 2012-052985 | A | 3/2012 |

(56) References Cited

FOREIGN PATENT DOCUMENTS

| | | | |
|---|---|---|---|
| JP | 2016-515203 | A | 5/2016 |
| WO | 2019/049442 | A1 | 3/2019 |

OTHER PUBLICATIONS

Robinson, Wiley, 2019, pp. 823-824.*

International Search Report and Written Opinion of PCT Application No. PCT/JP2021/012074, issued on Jun. 15, 2021, 08 pages of ISRWO.

* cited by examiner

Y
X

FLUORESCENCE INTENSITY
CHANNEL

FLUORESCENCE INTENSITY
CHANNEL

APPEARANCE FREQUENCY
W2
0

APPEARANCE FREQUENCY
W1
0

INFORMATION PROCESSING DEVICE, INFORMATION PROCESSING METHOD, AND OPTICAL MEASUREMENT SYSTEM

CROSS REFERENCE TO RELATED APPLICATIONS

This application is a U.S. National Phase of International Patent Application No. PCT/JP2021/012074 filed on Mar. 23, 2021, which claims priority benefit of Japanese Patent Application No. JP 2020-062166 filed in the Japan Patent Office on Mar. 31, 2020. Each of the above-referenced applications is hereby incorporated herein by reference in its entirety.

FIELD

The present disclosure relates to an information processing device, an information processing method, a program, and an optical measurement system.

BACKGROUND

In general, when a protein of an organism-related microparticle (hereinafter, simply referred to as a microparticle) such as a cell, a microorganism, or a liposome is analyzed, flow cytometry (flow cytometer) is widely used. The flow cytometry is a method for analyzing a plurality of microparticles one by one by irradiating microparticles flowing in a flow path with a laser beam (excitation beam) having a specific wavelength and detecting a fluorescent beam or a scattered beam emitted from each of the microparticles. In this flow cytometry, by converting light detected by a photodetector into an electrical signal for quantification, and performing statistical analysis, the type, size, structure, and the like of each microparticle can be determined.

In addition, in recent years, a next-generation flow cytometer that can be used without worrying about leakage even without disposing many high-sensitivity photodetectors, such as a spectral flow cytometer, has been developed.

The spectral flow cytometer does not have a configuration in which one high-sensitivity photodetector is disposed for one fluorescent dye, unlike a conventional flow cytometer, and therefore can obtain a large amount of fluorescence information from one microparticle. Therefore, various fluorescence separation processes can be used for the fluorescence information obtained from the spectral flow cytometer.

CITATION LIST

Patent Literature

Patent Literature 1: JP 2012-52985 A

SUMMARY

Technical Problem

However, in the spectral flow cytometer, a difference is generated in fluorescence separation performance, processing time, reliability, result stability, and the like depending on the performance of the device itself, the type of a microparticle to be measured, and the like. Therefore, it is difficult to set a suitable fluorescence separation method according to an object to be measured.

Therefore, the present disclosure proposes an information processing device, an information processing method, a program, and an optical measurement system that make it possible to set a suitable fluorescence separation method according to an object to be measured.

Solution to Problem

An information processing device according to one embodiment comprises a separation unit that calculates, from a fluorescence signal measured from a biological sample labeled with one or more fluorescent dyes, fluorescence intensities of one or more fluorescent beams and an autofluorescent beam emitted from the one or more fluorescent dyes and the biological sample, respectively, by an arithmetic operation using a least squares method using a fluorescence spectrum reference of each of the fluorescent dyes and an autofluorescence spectrum of the biological sample, wherein in the arithmetic operation using the least squares method, an upper limit value and a lower limit value of the fluorescence intensity are set for each of the one or more fluorescent beams and the autofluorescent beam.

DESCRIPTION OF EMBODIMENTS

Figure 1:
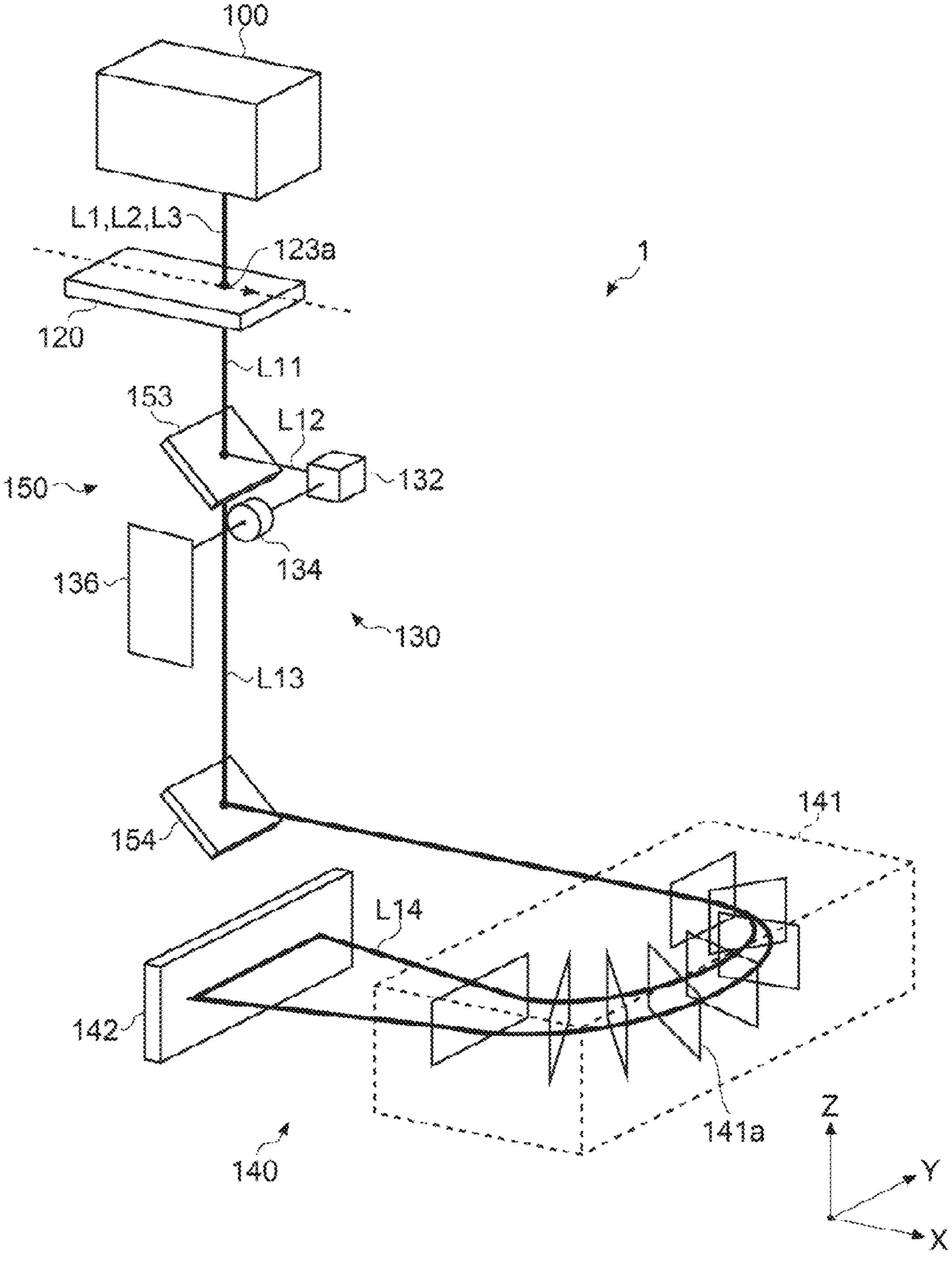
FIG. 1 is a schematic diagram illustrating a schematic configuration example of a spectral flow cytometer used in an embodiment.

Hereinafter, a preferred embodiment of the present disclosure will be described in detail with reference to the attached drawings. Note that, in the present specification and the drawings, components having substantially the same functional configuration are denoted by the same reference numeral, and redundant description is omitted.

Note that the description will be given in the following order.

1. Introduction
2. Embodiment
  2.1 Outline of flow cytometer
  2.2 Schematic configuration example of spectral flow cytometer
  2.3 Schematic configuration example of information processing system
  2.4 Regarding unmixing
  2.5 Regarding optimization of fixed noise for each measurement channel
  2.6 Regarding limited autofluorescence correction
  2.7 Regarding automatic determination of limited autofluorescence correction parameter
  2.8 Action and effect

1. Introduction

In flow cytometry in basic medicine and clinical fields, multicolor analysis using a plurality of fluorescent dyes has become widespread in order to advance comprehensive interpretation. However, when a plurality of fluorescent dyes is used for one measurement as in multicolor analysis, light from a fluorescent dye other than a target fluorescent dye leaks into each photodetector, which may reduce analysis accuracy. Therefore, in flow cytometry compatible with multicolor analysis, it is conceivable to perform fluorescence correction in order to extract only target light information from a target fluorescent dye.

The fluorescence correction is, for example, to make a correction for subtracting light that has leaked so as to obtain light from a target fluorescent dye.

However, in a case of fluorescent dyes whose spectra are close to each other, leakage to a photodetector is large, and therefore fluorescence correction cannot be performed in some cases.

As a method for solving such a problem, for example, it is conceivable to use a spectral flow cytometer. The spectral flow cytometer is a system that analyzes a fluorescence amount of each microparticle by deconvoluting (unmixing) fluorescence data measured from microparticles with spectral information of a fluorescent dye used for staining, and includes an array type high-sensitivity photodetector for detecting a spectrum instead of many high-sensitivity photodetectors included in a conventional flow cytometer.

As described above, such a spectral flow cytometer can obtain a large amount of fluorescence information from one microparticle. Therefore, various fluorescence separation processes can be used for the fluorescence information obtained from the spectral flow cytometer.

However, a difference is generated in fluorescence separation performance, processing time, reliability, result stability, and the like depending on the performance of the spectral flow cytometer itself, a microparticle to be measured, and the like. Therefore, it is difficult to set a suitable fluorescence separation method for each object to be measured.

In addition, many existing spectral flow cytometers are configured such that a user can easily operate the spectral flow cytometer by limiting a degree of parameter freedom to a range that can be controlled by a general user. Therefore, there is a situation in which separation ability of a fluorescent dye, which is originally possessed by the spectral flow cytometer, cannot be maximized.

Therefore, the following embodiment proposes an information processing device, an information processing method, a program, and an optical measurement system in which separation ability of a fluorescent dye is further improved by making it possible to set a suitable fluorescence separation method according to an object to be measured.

2. Embodiment

Hereinafter, a first embodiment of the present disclosure will be described in detail with reference to the drawings.

2.1 Outline of Flow Cytometer

A flow cytometer according to the present embodiment may be a device that analyzes each sample using an analysis method called flow cytometry. In the flow cytometer, a sample is labeled with a fluorescent reagent that emits light under a specific condition, and light emitted when the sample is irradiated with an excitation beam is collected as fluorescence information. Cells can be analyzed from this fluorescence information.

In a general flow cytometer, a fluorescent beam emitted from a sample is divided and extracted for each wavelength range by using an optical filter, and data obtained by measuring the fluorescence is used as information regarding a fluorescent dye (corresponding to the following fluorescent dye information).

Meanwhile, in the spectral flow cytometer, a spectroscope including a prism or the like separates fluorescent beams for each wavelength without using an optical filter and measures a light intensity for each wavelength, thereby acquiring spectral information of light emitted from a sample. Hereinafter, the measured spectrum information is referred to as a measurement spectrum. Then, this measurement spectrum is separated for each fluorescent dye by a process called spectrum-unmixing (hereinafter, simply referred to as unmixing) using a fluorescence spectrum reference.

Here, the fluorescence spectrum reference is spectrum information serving as a reference of each fluorescent dye, and may be, for example, spectrum information of a fluorescence component measured from a sample (hereinafter, also referred to as a single stained sample) labeled with a single fluorescent dye. In addition, the definition of the fluorescence spectrum reference may include, for example, spectrum information (hereinafter, referred to as an autofluorescence spectrum) of an autofluorescence component measured from an unlabeled sample (hereinafter, also referred to as an unstained sample). As the fluorescence spectrum reference, a value actually measured by the spectral flow cytometer may be used, or a catalog value provided from a provider of a fluorescent dye or the like may be used.

The unmixing in the present embodiment is a method for obtaining fluorescent dye information (for example, fluorescence intensity) for each fluorescent dye from a measurement spectrum by performing approximation of a measurement spectrum measured by the spectral flow cytometer with a linear sum of fluorescence spectrum references for each fluorescent dye. The fluorescent dye information for each fluorescent dye generated by the unmixing is used, for example, for analysis of a sample such as cells.

Note that a fluorescence signal in the present description may be defined as a concept including both a measurement spectrum and fluorescent dye information.

In the present embodiment, as an optical measurement device, a spectral flow cytometer capable of acquiring both a measurement spectrum and fluorescent dye information is exemplified, but the present disclosure is not limited thereto, and a general flow cytometer that acquires fluorescent dye information can also be used.

Here, in the flow cytometer, there are a microchip method, a droplet method, a cuvette method, a flow cell method, and the like as a method for supplying a sample to an observation point (hereinafter, referred to as a spot) on a flow path. In the present embodiment, a microchip method (partially, a flow cell method) flow cytometer is exemplified, but the present disclosure is not limited thereto, and may be a flow cytometer of another supply method.

In addition, the flow cytometer includes an analyzer type for the purpose of analyzing a sample such as cells and a cell sorter type for the purpose of analyzing and sorting a sample. In the present embodiment, an analyzer type flow cytometer is exemplified, but the present disclosure is not limited thereto, and may be a sorter type flow cytometer.

Furthermore, the present disclosure is not limited to the flow cytometer, and may be various optical measurement devices that irradiate a sample with an excitation beam and analyze a sample on the basis of a fluorescent beam thereof. For example, the present disclosure may be a microscope that acquires an image of a sample such as a tissue section on a slide.

2.2 Schematic Configuration Example of Spectral Flow Cytometer

Figure 2:
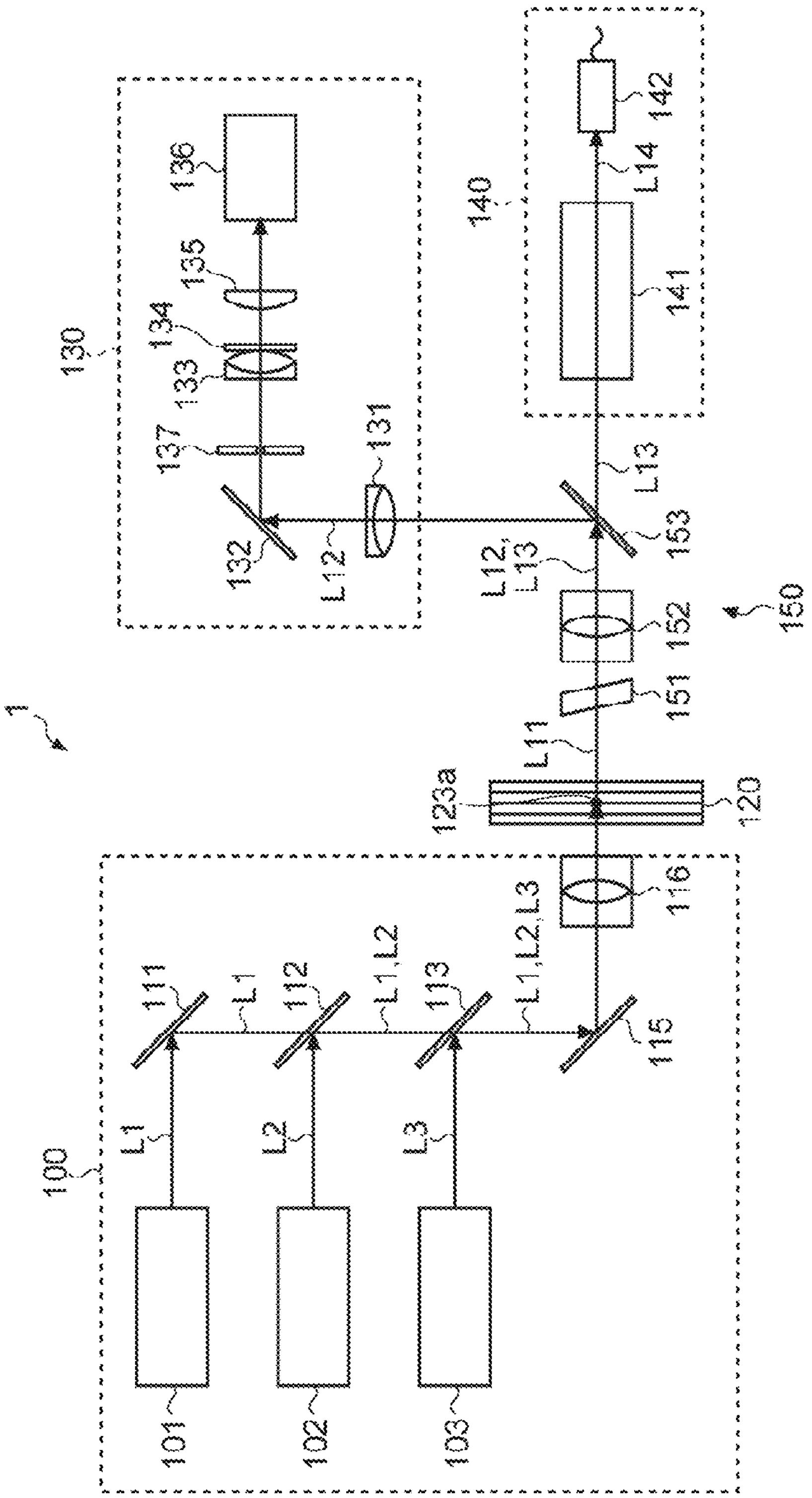
FIG. 2 is a block diagram illustrating a schematic configuration example of the flow cytometer illustrated in FIG. 1.

FIG. 1 is a schematic diagram illustrating a schematic configuration example of a spectral flow cytometer (hereinafter, simply referred to as a flow cytometer) used in the present embodiment. In addition, FIG. 2 is a block diagram illustrating a schematic configuration example of the flow cytometer illustrated in FIG. 1. Note that some optical elements are omitted in each of FIGS. 1 and 2 for convenience of drawing.

As illustrated in FIGS. 1 and 2, a flow cytometer 1 according to the present embodiment includes a light source unit 100, a demultiplexing optical system 150, a scattered light detection unit 130, and a fluorescence detection unit 140, and detects light from a sample supplied onto a predetermined flow path using a microchip 120.

The sample is, for example, an organism-derived particle such as a cell, a microorganism, or an organism-related particle, and includes a population of a plurality of organism-derived particles. The sample may be, for example, a cell such as an animal cell (for example, a blood cell) or a plant cell, a microorganism such as a bacterium including *Escherichia coli*, a virus including a tobacco mosaic virus, or a fungus including yeast, an organism-related particle constituting a cell of a chromosome, a liposome, a mitochondria, an exosome, or various organelles, or an organism-derived microparticle such as an organism-related polymer including a nucleic acid, a protein, a lipid, a sugar chain, and complexes thereof. Furthermore, the sample widely includes a synthetic particle such as a latex particle, a gel particle, or an industrial particle. In addition, the industrial particle may be, for example, an organic or inorganic polymer material, or a metal. The organic polymer material includes polystyrene, styrene-divinylbenzene, polymethyl methacrylate, and the like. The inorganic polymer material includes glass, silica, a magnetic material, and the like. The metal includes gold colloid, aluminum, and the like. The shape of each of these particles is generally spherical, but may be non-spherical, and the size, mass, and the like thereof are not particularly limited.

Here, the sample is labeled (stained) with one or more fluorescent dyes. The sample can be labeled with a fluorescent dye by a known method. For example, when the sample is a cell, a fluorescently labeled antibody that is selectively bonded to an antigen present on a surface of the cell is mixed with the cell to be measured, and the fluorescently labeled antibody is bonded to the antigen on the surface of the cell. As a result, the cell to be measured can be labeled with a fluorescent dye.

The fluorescently labeled antibody is an antibody to which a fluorescent dye is bonded as a label. Specifically, the fluorescently labeled antibody may be an antibody obtained by bonding a fluorescent dye to which avidin is bonded to a biotin-labeled antibody by an avidin-biotin reaction. Alternatively, the fluorescently labeled antibody may be an antibody to which a fluorescent dye is directly bonded. Note that as the antibody, either a polyclonal antibody or a monoclonal antibody can be used. In addition, the fluorescent dye for labeling a sample is not particularly limited, and at least one known dye used for staining a cell or the like can be used.

(Light Source Unit 100)

As illustrated in FIG. 1, the light source unit 100 includes, for example, one or more (three in this example) excitation light sources 101 to 103, a total reflection mirror 111, dichroic mirrors 112 and 113, a total reflection mirror 115, and an objective lens 116.

In this configuration, the total reflection mirror 111, the dichroic mirrors 112 and 113, and the total reflection mirror 115 constitute a waveguide optical system that guides excitation beams L1 to L3 emitted from the excitation light sources 101 to 103, respectively, onto a predetermined optical path.

The objective lens 116 constitutes a condensing optical system that condenses the excitation beams L1 to L3 propagated on the predetermined optical path on a spot **123*a* set on a flow path in the microchip 120. Note that the number of spots 123*a* is not limited to one. That is, the excitation beams L1 to L3 may be condensed on different spots. In addition, the condensing positions of the excitation beams L1 to L3 do not need to coincide with the spot 123*a***, and may be shifted back and forth on the respective optical axes thereof.

In the example illustrated in FIG. 1, the three excitation light sources 101 to 103 that emit excitation beams L1 to L3 having different wavelengths, respectively, are disposed. For each of the excitation light sources 101 to 103, for example, a laser light source that emits coherent light may be used.

For example, the excitation light source 102 may be a diode pumped solid state laser (DPSS laser) that emits a blue laser beam (peak wavelength: 488 nm (nanometer), power: 20 mW). In addition, the excitation light source 101 may be a laser diode that emits a red laser beam (peak wavelength: 637 nm, power: 20 mW), and similarly, the excitation light source 103 may be a laser diode that emits a near-ultraviolet laser beam (peak wavelength: 405 nm, power: 8 mW). In addition, the excitation beams L1 to L3 emitted from the excitation light sources 101 to 103, respectively, may be pulse beams.

For example, the total reflection mirror 111 totally reflects the excitation beam L1 emitted from the excitation light source 101 in a predetermined direction.

The dichroic mirror 112 is an optical element that makes the optical axis of the excitation beam L1 reflected by the total reflection mirror 111 coincide with or parallel to the optical axis of the excitation beam L2 emitted from the excitation light source 102. For example, the dichroic mirror 112 transmits the excitation beam L1 from the total reflection mirror 111 and reflects the excitation beam L2 from the excitation light source 102. As the dichroic mirror 112, for example, a dichroic mirror designed to transmit light having a wavelength of 637 nm and to reflect light having a wavelength of 488 nm may be used.

The dichroic mirror 113 is an optical element that makes the optical axes of the excitation beams L1 and L2 from the dichroic mirror 112 coincide with or parallel to the optical axis of the excitation beam L3 emitted from the excitation light source 103. For example, the dichroic mirror 113 transmits the excitation beam L1 from the total reflection mirror 111 and reflects the excitation beam L3 from the excitation light source 103. As the dichroic mirror 113, for example, a dichroic mirror designed to transmit light having a wavelength of 637 nm and light having a wavelength of 488 nm and to reflect light having a wavelength of 405 nm may be used.

The excitation beams L1 to L3 finally collected as light traveling in the same direction by the dichroic mirror 113 are totally reflected by the total reflection mirror 115 and are incident on the objective lens 116.

Note that a beam shaping unit for converting the excitation beams L1 to L3 into parallel light may be disposed on an optical path from each of the excitation light sources 101 to 103 to the objective lens 116. The beam shaping unit may include, for example, one or more lenses, mirrors, and the like.

The objective lens 116 condenses the incident excitation beams L1 to L3 on the predetermined spot 123*a* on a flow path in the microchip 120 described later. The spot 123*a* is irradiated with the excitation beams L1 to L3 as pulse beams while the sample is passing through the spot 123*a*. As a result, a fluorescent beam is emitted from the sample, and the excitation beams L1 to L3 are scattered by the sample to generate scattered beams.

In the present description, among the scattered beams generated from the sample in all directions, a component traveling forward in a traveling direction of the excitation beams L1 to L3 within a predetermined angle range is referred to as a forward scattered beam L12, a component traveling backward in the traveling direction of the excitation beams L1 to L3 within a predetermined angle range is referred to as a backward scattered beam, and a component in a direction outside a predetermined angle with respect to the optical axes of the excitation beams L1 to L3 is referred to as a side scattered beam.

The objective lens 116 has, for example, a numerical aperture corresponding to about 30° to 40° with respect to an optical axis. Among the fluorescent beams emitted from the sample, a component traveling forward in the traveling direction of the excitation beams L1 to L3 within a predetermined angle range (hereinafter, referred to as a fluorescent beam L13) and the forward scattered beam L12 are input to the demultiplexing optical system 150 disposed forward in the traveling direction of the excitation beams L1 to L3.

(Demultiplexing Optical System 150)

As illustrated in FIGS. 1 and 2, the demultiplexing optical system 150 includes, for example, a filter 151, a collimator lens 152, a dichroic mirror 153, and a total reflection mirror 154 (see FIG. 1). However, the present disclosure is not limited to this configuration, and various modifications may be made.

The filter 151 disposed on a downstream side of the microchip 120 on the optical path of the excitation beams L1 to L3 selectively blocks, for example, a part (for example, excitation beams L1 and L3) of the excitation beams L1 to L3 among beams L11 traveling to the downstream side of the microchip 120. Here, the light traveling to the downstream side of the microchip 120 includes the excitation beams L1 to L3 (including forward scattered beam thereof) and the fluorescent beam L13 emitted from the sample in the microchip 120. Therefore, the filter 151 blocks the components of the excitation beams L1 and L3, and transmits the component of the excitation beam L2 (referred to as the forward scattered beam L12) and the fluorescent beam L13.

Note that the filter 151 is disposed to be inclined with respect to the optical axis of a beam L16. As a result, return light of the beam L16 reflected by the filter 151 is prevented from being incident on the scattered light detection unit 130 or the like via the objective lens 116 or the like.

The forward scattered beam L12 and the fluorescent beam L13 that have passed through the filter 151 are, for example, converted into collimated light by the collimator lens 152 and then demultiplexed by the dichroic mirror 153. For example, the dichroic mirror 153 reflects the forward scattered beam L12 and transmits fluorescent beam L13 out of the incident beams. The forward scattered beam L12 reflected by the dichroic mirror 153 is guided to the scattered light detection unit 130, and the fluorescent beam L13 that has passed through the dichroic mirror 153 is guided to the fluorescence detection unit 140.

(Scattered Light Detection Unit 130)

The scattered light detection unit 130 includes, for example, a plurality of lenses 131, 133, and 135 that shapes a beam cross section of the forward scattered beam L12 reflected by the dichroic mirror 153 and the total reflection mirror 132, a diaphragm 137 that adjusts the light amount of the forward scattered beam L12, a mask 134 that selectively transmits light having a specific wavelength (for example, the component of the excitation beam L2) of the forward scattered beam L12, and a photodetector 136 that detects light that has passed through the mask 134 and the lens 135 and is incident thereon.

The photodetector 136 includes, for example, a two-dimensional image sensor, a photodiode, and the like, and detects the light amount and the size of light that has passed through the mask 134 and the lens 135 and is incident thereon. A signal detected by the photodetector 136 is input to, for example, a device control unit 11, a data recording unit 13, and/or a data analysis unit 14 in an information processing system 10 described later described later.

(Fluorescence Detection Unit 140)

The fluorescence detection unit 140 includes, for example, a spectroscopic optical system 141 that spectrally disperses the incident fluorescent beam L13 into dispersed beams L14 for each wavelength, and a photodetector 142 that detects the light amount of the dispersed beams L14 for each predetermined wavelength band (also referred to as channel).

The spectroscopic optical system 141 includes, for example, one or more optical elements 141*a* such as a prism and a diffraction grating, and spectrally disperses the incident fluorescent beam L13 into the dispersed beams 7L14 to be emitted at an angle varying depending on a wavelength.

The photodetector 142 may include, for example, a plurality of light receiving units that receives light for each channel. In this case, the plurality of light receiving units may be arranged in one column or two or more columns in a spectroscopic direction by the spectroscopic optical system 141. In addition, for each of the light receiving units, for example, a photoelectric conversion element such as a photomultiplier tube can be used. However, a two-dimensional image sensor or the like can be used instead of the plurality of light receiving units.

A signal (fluorescence signal) detected by the photodetector 142 and indicating the light amount of the fluorescent beam L13 for each channel is input to, for example, the device control unit 11, the data recording unit 13, and/or the data analysis unit 14 in the information processing system 10 described later.

2.3 Schematic Configuration Example of Information Processing System

Figure 3:
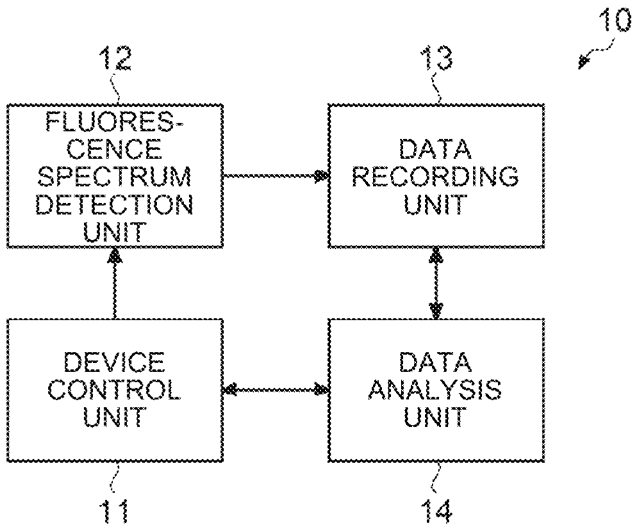
FIG. 3 is a block diagram illustrating a schematic configuration example of an information processing system according to the embodiment.

FIG. 3 is a block diagram illustrating a schematic configuration example of an information processing system according to the present embodiment. As illustrated in FIG. 3, the information processing system 10 roughly includes the device control unit 11 that sets a measurement condition and controls an operation of the device (that is, the flow cytometer 1), a fluorescence spectrum detection unit 12 that detects the fluorescence amounts of many samples, the data recording unit 13 that records spectrum information of each detected sample, and the data analysis unit 14 that performs various data processes so as to obtain a desired analysis result from the recorded data.

(Device Control Unit 11)

The device control unit 11 optimizes measurement conditions by changing a liquid feeding condition of a sample flowing in a flow path of the microchip 120 and parameters for laser output of the excitation light sources 101 to 103, sensitivity control of the photodetectors 136 and 142, position adjustment of an optical stage including each optical element in an optical system such as the dichroic mirror 153, and the like. As a specific operation procedure, in order to set an optimum condition under which a desired result can be obtained for a sample to be measured, a user feeds an actual sample in the microchip 120, and repeats an operation of adjusting various parameters as needed while viewing a fluorescence signal detected by the photodetector 142. In order to make easy change of parameter setting possible, the device control unit 11 is constituted by, for example, a terminal device such as a personal computer (PC). A user inputs changes of various parameters through control software mainly executed by the device control unit 11.

(Fluorescence Spectrum Detection Unit 12)

The fluorescence spectrum detection unit 12 corresponds to, for example, the flow cytometer 1 described with reference to FIGS. 1 and 2, and optically analyzes a sample. Specifically, the fluorescence spectrum detection unit 12 first emits the excitation beams L1 to L3 from the excitation light sources 101 to 103, respectively, and irradiates a sample flowing in a flow path with the excitation beams L1 to L3. Next, the fluorescence spectrum detection unit 12 detects the fluorescent beam L13 emitted from the sample. For example, as described above, the fluorescence spectrum detection unit 12 separates a beam having a specific wavelength (target fluorescent beam L13) from light emitted from a sample using the dichroic mirror 153, the filter 151, and the like, and detects the separated beam with the photodetector 142 such as a 32 channel photomultiplier tube (PMT) or an image sensor. At this time, the fluorescent beam L13 is spectrally dispersed by the spectroscopic optical system 141 including, for example, a prism or a diffraction grating, and a beam having a wavelength varying depending on a channel of the photodetector 142 is detected. As a result, spectrum information of a detected beam (fluorescent beam) can be easily obtained. The sample to be analyzed is not particularly limited, and examples thereof include cells and micro-beads.

(Data Recording Unit 13)

The data recording unit 13 is, for example, a recording device using a memory or a disk, and records spectrum information of each sample acquired by the fluorescence spectrum detection unit 12 together with information of a scattered beam, time, and position, other than the spectrum information. In normal sample analysis of cells and the like, several thousands to several millions of samples are analyzed under one experimental condition. Therefore, a large number of pieces of spectrum information are recorded in the data recording unit 13, for example, in an organized state for each experimental condition.

(Data Analysis Unit 14)

The data analysis unit (separation unit) 14 is constituted by, for example, an information processing device such as a PC, quantifies a light intensity in each wavelength region detected by the fluorescence spectrum detection unit 12 and executes unmixing for obtaining a fluorescence amount (intensity) for each fluorescent dye used. For this unmixing, for example, linear fitting by a least squares method using a fluorescence spectrum reference calculated from experimental data can be used.

The fluorescence spectrum reference can be calculated by statistical processing using two types of spectrum information obtained from a single stained sample stained with only one fluorescent dye and spectrum information obtained from an unstained sample. By appropriately performing this statistical processing, the specious spectral shape of the fluorescence spectrum reference of the fluorescent dye used for staining and the spectral shape of the autofluorescence component of the unstained sample (this is also one of the fluorescence spectrum references) can be estimated from actual data measured by the flow cytometer 1.

The calculated fluorescence spectrum reference is recorded in the data recording unit 13 together with information such as a fluorescence molecule name, a measurement date, and the type of a sample. The fluorescence amount of the sample estimated by the data analysis unit 14 is also stored in the data recording unit 13, graphed and displayed according to a purpose, and thereby used for analysis of the sample by a user.

In this manner, the data analysis unit 14 executes unmixing for calculating a fluorescence amount from spectrum information (hereinafter, referred to as measurement data) measured from many samples. In the unmixing, for example, the fluorescence amount of each fluorescent dye is calculated by a process based on a least squares method. In the present embodiment, a parameter related to the unmixing executed by the data analysis unit 14 is correctly calculated from the measurement data, thereby achieving high resolution of fluorescence separation process calculation according to a purpose.

2.4 Regarding Unmixing

Figure 4C:
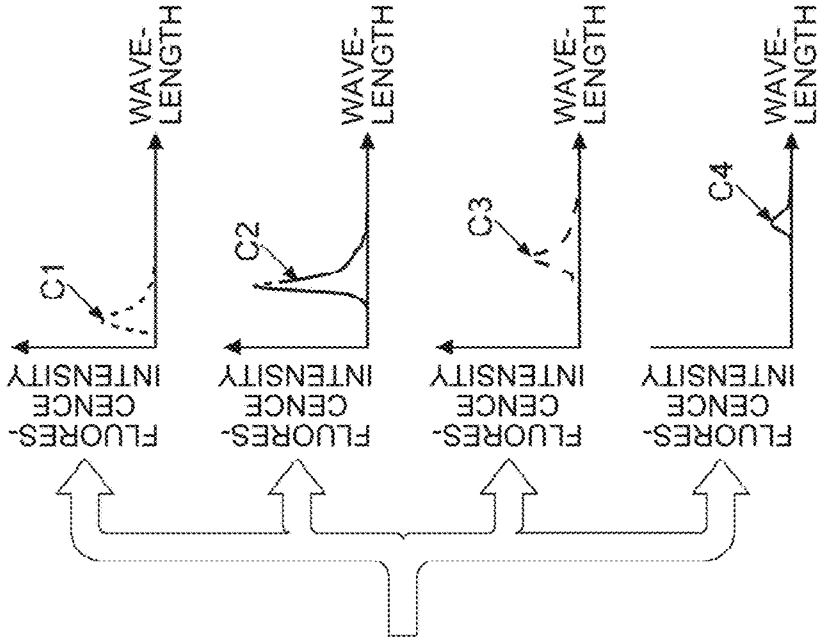
FIGS. 4A, 4B, and 4C are diagrams for explaining an outline of unmixing according to the embodiment.
Figure 4B:
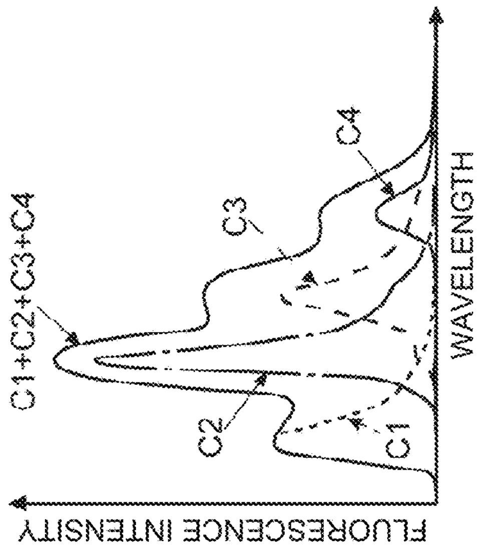
Figure 4A:
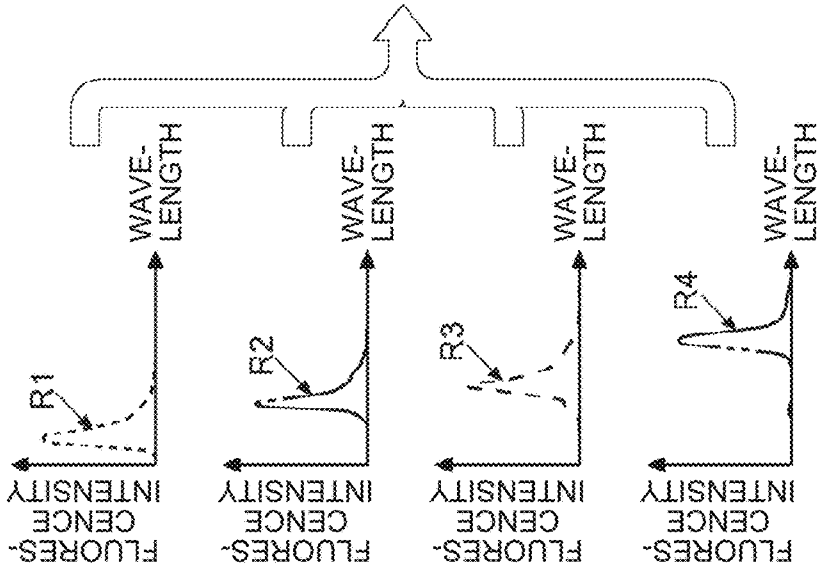

FIGS. 4A, 4B, and 4C are diagrams for explaining an outline of unmixing according to the present embodiment. As illustrated in FIGS. 4A, 4B, and 4C, in the unmixing according to the present embodiment, the spectrum waveform of a fluorescent dye extracted from spectrum information acquired from a single stained sample is used as a fluorescence spectrum reference (fluorescence spectrum references R1 to R4 illustrated in FIG. 4A), and the fluorescence intensity of each fluorescent dye included in spectrum information (spectrum information C1+C2+C3+C4 illustrated in (b) in FIG. 4B) measured from a multiple stained sample is calculated by calculation to separate spectrum information (spectrum information C1 to C4 illustrated in FIG. 4C) of each fluorescent dye included in measurement data (unmixing).

In this unmixing, a least squares method (LSM) as illustrated in the following formula (1), a weighted least squares method (weighted LSM) as illustrated in formula (2), and the like can be used.

$$\begin{bmatrix} x_1 \\ \vdots \\ x_n \end{bmatrix} = ([S^T][S])^{-1}[S^T]\begin{bmatrix} y_1 \\ \vdots \\ y_m \end{bmatrix} \tag{1}$$

$$\begin{bmatrix} x_1 \\ \vdots \\ x_n \end{bmatrix} = ([S^T][L][S])^{-1}[S^T][L]\begin{bmatrix} y_1 \\ \vdots \\ y_m \end{bmatrix} \tag{2}$$

Note that, in formulas (1) and (2), S represents a matrix (hereinafter, referred to as a reference spectrum) in which fluorescence spectrum references used for unmixing are arranged in a column direction, $S^T$ represents a transposed matrix of the reference spectrum S, $y_j$ represents measured spectrum information (also referred to as an observation value), and $x_i$ represents a fluorescence intensity to be obtained. Note that in the present description, i and j are integers of 1 or more. In addition, in formula (2), L represents a weighting coefficient matrix expressed by the following formula (3). Furthermore, in formula (3), $\lambda_i$ represents a weighting coefficient expressed by the following formula (4).

$$L = \begin{bmatrix} \lambda_1 & 0 & 0 \\ 0 & \ddots & 0 \\ 0 & 0 & \lambda_{66} \end{bmatrix} \tag{3}$$

$$\lambda_1 = \frac{1}{\underbrace{\max(y_i, 0)}_{\uparrow \text{ Poisson noise term}} + \underbrace{\mathit{offset}}_{\uparrow \text{ fixed noise term}}} \tag{4}$$

As illustrated in formulas (1) to (4), in the unmixing, a general least squares method (LSM) or WLSM including a Poisson noise term based on the amount of light measured by a flow cytometer is used. Out of these, when LSM is used, the amount of calculation is small and processing time is short, but on the other hand, contribution of a portion having a small fluorescence intensity is small. Therefore, separation performance between positive and negative in actual data of a flow cytometer is often better when WLSM is used.

Note that when WLSM is used, it is desirable to set a fixed noise term in order to prevent an excessive weight from being imparted to data having a small value. For this fixed noise term, for example, a constant having empirically improved separation performance based on evaluation at a device development stage can be used as a fixed value.

2.5 Regarding Optimization of Fixed Noise for Each Measurement Channel

In an unmixing algorithm according to the present embodiment, it is possible to improve fluorescence separation performance by setting a fixed noise term in formula (4) to an optimal value varying depending on a measurement channel. A value used for the fixed noise term can be calculated, for example, from a variation for each channel of measurement data of an unstained sample. The measurement data of the unstained sample includes all of autofluorescence of the sample, a noise of the device, an influence of a Raman shift of the excitation beams L1 to L3, and the like. Since a fluorescent component from a fluorescent dye is detected in a form of being added to the autofluorescence of the unstained sample, the measurement variation of the unstained sample determines a detection limit.

Figure 5A:
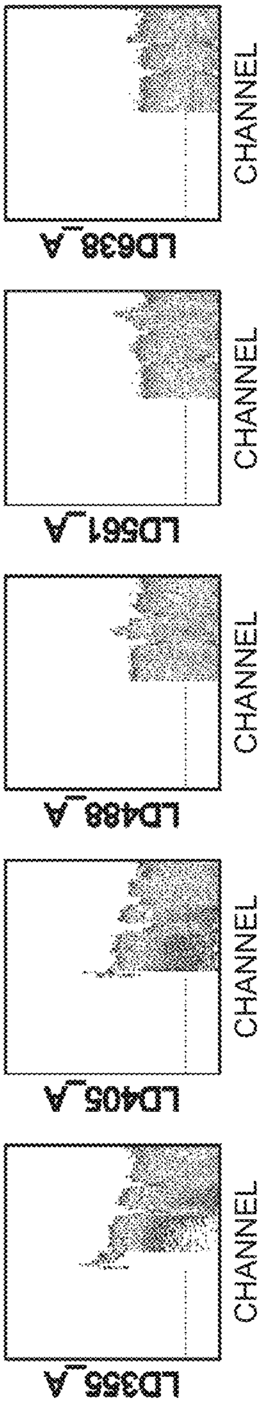
FIGS. 5A and 5B are graphs illustrating examples of spectral information and standard deviation obtained when unstained microbeads are used as an unstained sample.
Figure 5B:
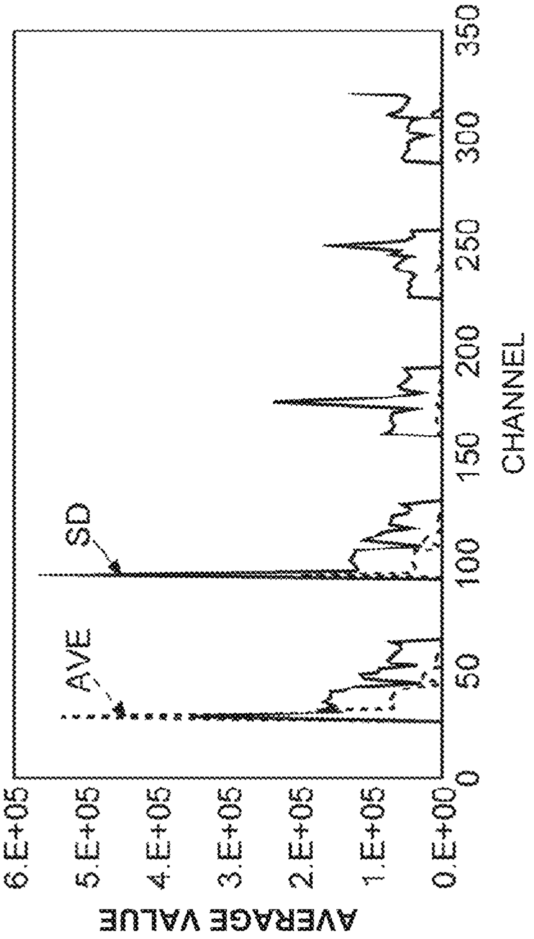

FIGS. 5A and 5B are graphs illustrating examples of spectral information and a standard deviation obtained when unstained microbeads are used as an unstained sample. FIG. 5A illustrates spectral information obtained by measuring unstained microbeads, and FIG. 5B illustrates a standard deviation thereof. By setting a fixed noise term based on the waveform as illustrated in FIGS. 5A and 5B, the separation performance by unmixing can be improved.

Note that by setting the waveform illustrated in FIGS. 5A and 5B for each sample to be measured such as various types of cells or microbeads, and each experiment, optimum conditions can be set. In addition, since the measurement of a sample in an unstained state necessary for this setting is an essential item even in measurement using a normal flow cytometer, it is possible to execute optimum separation processing without causing a user to perform additional work.

2.6 Regarding Limited Autofluorescence Correction

Next, a separation algorithm for optimally executing an autofluorescence correction function according to the present embodiment will be described.

Figure 6:
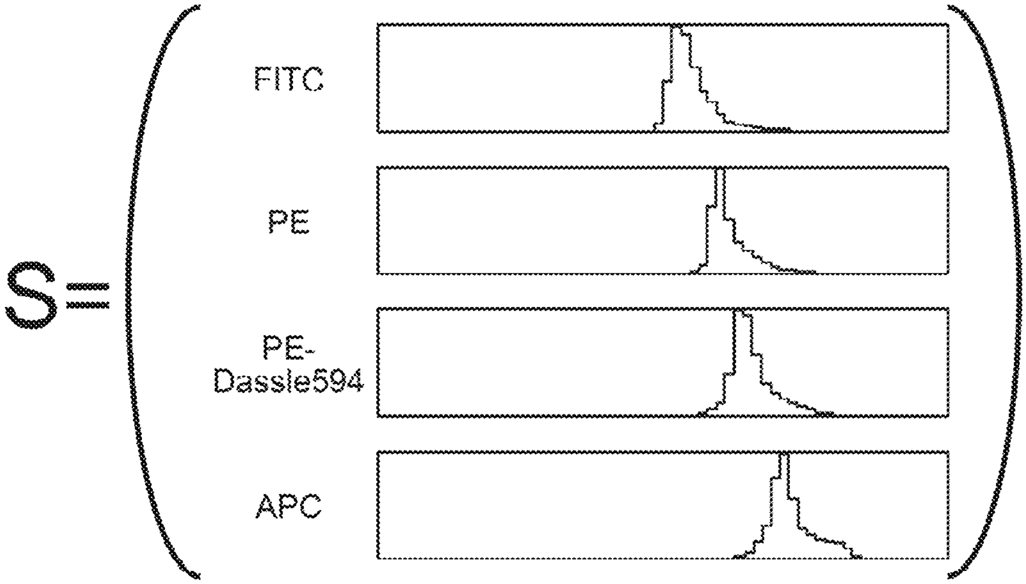
FIG. 6 is a diagram illustrating an example of a reference spectrum not including an autofluorescence spectrum.
Figure 7:
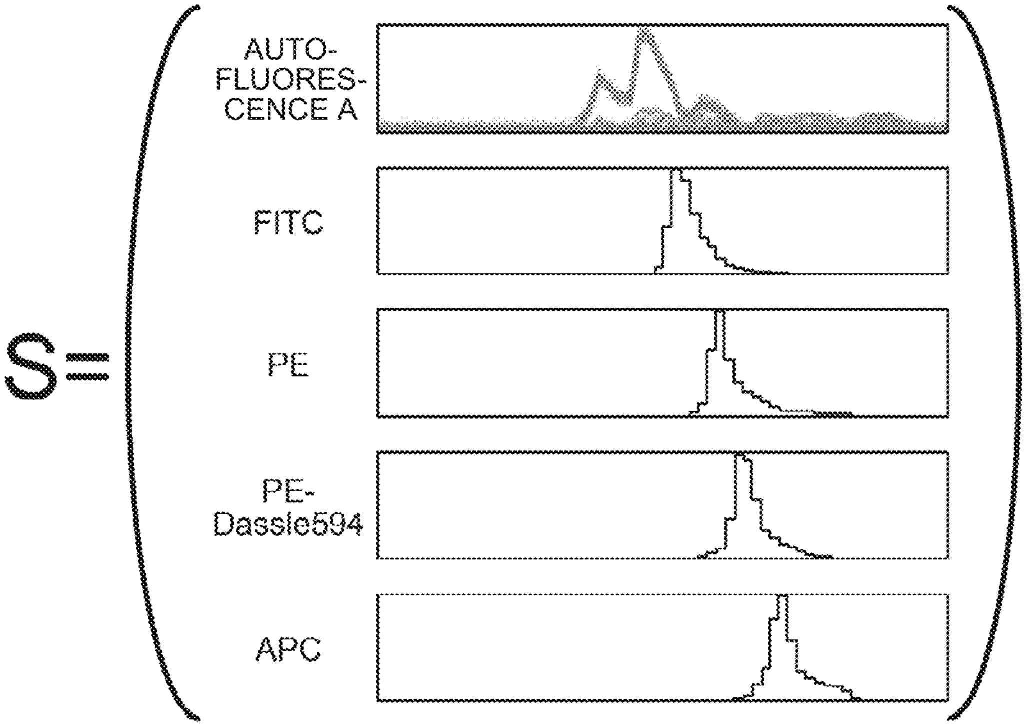
FIG. 7 is a diagram illustrating an example of a reference spectrum including an autofluorescence spectrum.

FIG. 6 is a diagram illustrating an example of a reference spectrum not including an autofluorescence spectrum, and FIG. 7 is a diagram illustrating an example of a reference spectrum including an autofluorescence spectrum. Note that the reference spectrum here corresponds to the reference spectrum S in formulas (1) and (2) described above. The reference spectrum S illustrated in FIG. 6 includes fluorescence spectrum references of four fluorescent components (fluorescent dyes): fluorescein isothiocyanate (FITC), phycoerythrin (PE), PE-Dazzle 594, and allophycocyanin (APC). In addition, the reference spectrum S illustrated in FIG. 7 includes an autofluorescence spectrum of a sample itself in addition to the four fluorescence spectrum references illustrated in FIG. 6. Note that FIGS. 6 and 7 illustrate a graph of a spectrum waveform as each fluorescence spectrum reference (including an autofluorescence spectrum), but actually, a fluorescence intensity for each channel of each fluorescence spectrum reference is stored in a row corresponding to each fluorescence spectrum reference.

As described above, the flow cytometer 1 uses a reference spectrum of a fluorescent dye as a reference when executing unmixing (see FIG. 6). Specifically, by subtracting a difference between an observation value $[y_1, \ldots, y_m]$ and an average value of an unstained sample (average value of an autofluorescence amount) from the observation value $[y_1, \ldots, y_m]$ and executing WLSM using the reference spectrum S illustrated in FIG. 6 on the result (see formulas (2) to (4)), a fluorescence intensity $[x_1, \ldots, x_n]$ of each fluorescent dye is derived.

In such unmixing, as illustrated in FIG. 7, by adding the autofluorescence spectrum of the sample to the reference spectrum S, a more ideal fluorescence separation process can be performed. Specifically, by executing WLSM using the reference spectrum S in which the autofluorescence spectrum illustrated in FIG. 7 is added to the observation value $[y_1, \ldots, y_m]$ as it is (see formulas (2) to (4)), a fluorescence intensity $[x_1, \ldots, x_n]$ of each fluorescent dye is derived.

However, when the autofluorescence spectrum is added as it is to the reference, a variation in the separation results of other fluorescent dyes is amplified, and fluorescence separation performance may be deteriorated. This will be described with reference to FIGS. 8 and 9.

Figure 8:
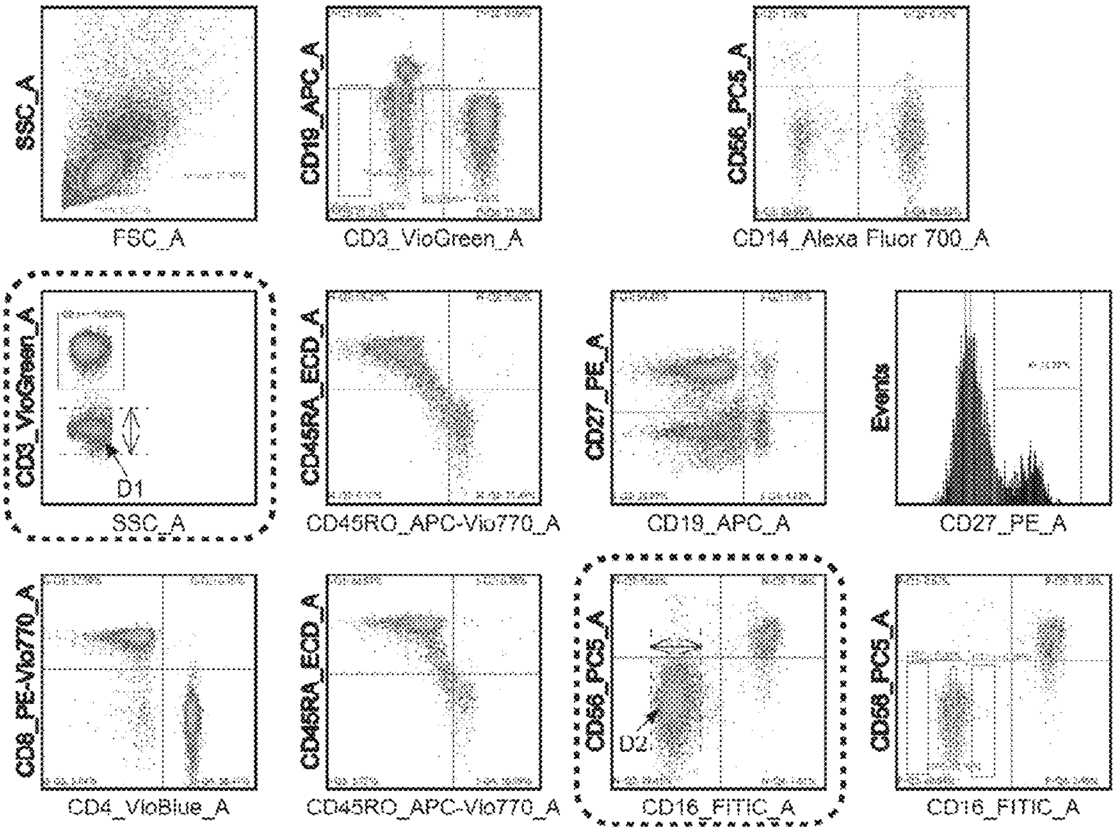
FIG. 8 is a two-dimensional plot illustrating an unmixing result when a reference spectrum not including an autofluorescence spectrum is used.
Figure 9:
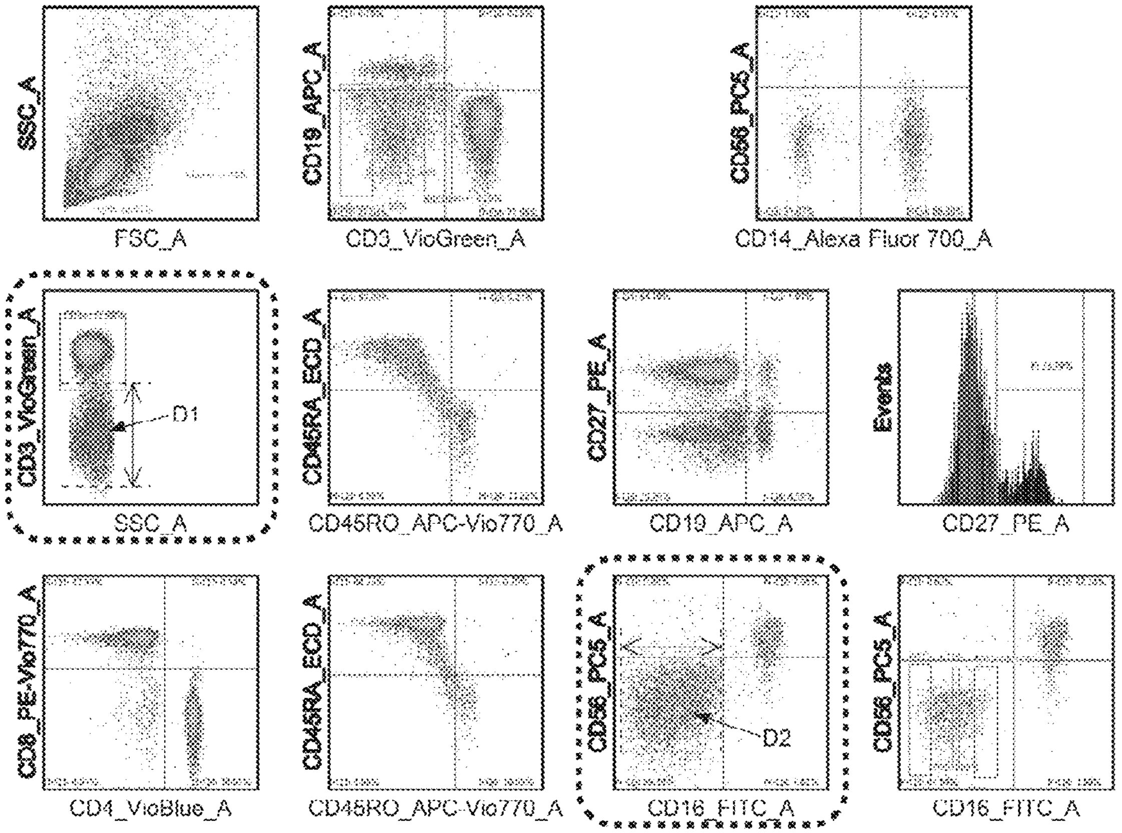
FIG. 9 is a two-dimensional plot illustrating an unmixing result when a reference spectrum including an autofluorescence spectrum is used.

FIG. 8 is a two-dimensional plot illustrating an unmixing result when a reference spectrum not including an autofluorescence spectrum is used, and FIG. 9 is a two-dimensional plot illustrating an unmixing result when a reference spectrum including an autofluorescence spectrum is used. As in a two-dimensional plot surrounded by a broken line in FIGS. 8 and 9, in a two-dimensional plot of SSC_A× CD3_VioGreen_A, a lower left distribution D1 in the graph spreads in the vertical axis direction (FIG. 8→FIG. 9), and in a two-dimensional plot of CD16_FITC_A× CD56_PC5_A, a left distribution D2 in the graph spreads in the horizontal axis direction (FIG. 8→FIG. 9).

As described above, as one of factors that deteriorate the fluorescence separation performance by using the reference spectrum including the autofluorescence spectrum, it is considered that a fluorescence spectrum reference of a fluorescent dye close to the shape of the autofluorescence spectrum included in the reference is included in the reference spectrum. This will be described with reference to FIGS. 10A, 10B, 10C, 10D, and 10E.

Figures 10A, 10B, 10C, 10D, 10E:
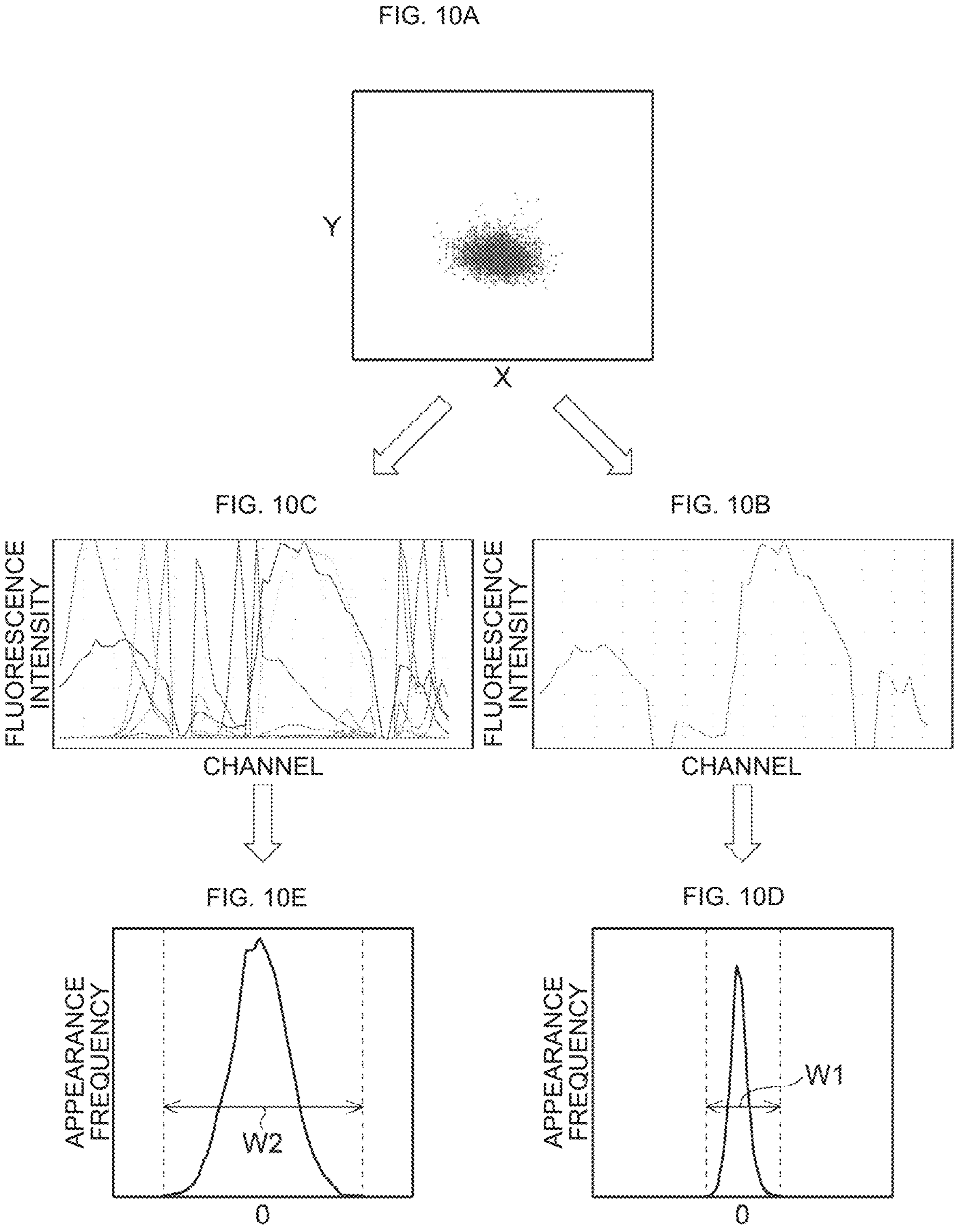
FIGS. 10A, 10B, 10C, 10D, and 10E are diagrams illustrating examples of unmixing results when a reference spectrum including only an autofluorescence spectrum is used and when a reference spectrum including both an autofluorescence spectrum and a fluorescence spectrum reference of a fluorescent dye is used.

FIGS. 10A, 10B, 10C, 10D, and 10E are diagrams illustrating an example of an unmixing result when a reference spectrum including only an autofluorescence spectrum is used and when a reference spectrum including both an autofluorescence spectrum and a fluorescence spectrum reference of a fluorescent dye is used. FIG. 10A illustrates a two-dimensional plot of measurement data measured from an unstained sample. FIG. 10B illustrates an example of a reference spectrum including only an autofluorescence spectrum of an unstained sample, and FIG. 10D illustrates a result of unmixing measurement data of FIG. 10A using the reference spectrum illustrated in FIG. 10B. In addition, FIG. 10C illustrates an example of a reference spectrum including a fluorescence spectrum reference of a fluorescent dye in addition to an autofluorescence spectrum, and FIG. 10E illustrates a result of unmixing measurement data of FIG. 10A using the reference spectrum illustrated in FIG. 10C.

As illustrated in FIGS. 10A, 10B, 10C, 10D, and 10E, it can be seen that a variation amount W2 of the autofluorescence component in a case of unmixing using a reference spectrum including a fluorescence spectrum reference of a fluorescent dye in addition to an autofluorescence spectrum (FIG. 10B→FIG. 10D) is larger than a variation amount W1 of an autofluorescence component in a case of unmixing using a reference spectrum including only an autofluorescence spectrum (FIG. 10C→FIG. 10E). As described above, one of factors thereof is considered to be that the reference spectrum of FIG. 10C includes a fluorescence spectrum reference of a fluorescent dye close to the spectrum shape of the autofluorescence spectrum.

Therefore, in the present embodiment, as illustrated in the following formula (5), a penalty term for suppressing an autofluorescence component (autofluorescence spectrum) in a reference spectrum is added to the above formula (2) for executing WLSM. Note that, in formula (5), p represents a penalty coefficient, and I represents a unit matrix.

$$\begin{bmatrix} x_1 \\ \vdots \\ x_n \end{bmatrix} = ([S^T][L][S] + \underset{\substack{\uparrow \\ \text{penalty term}}}{\underline{p[I])^{-1}}}\ [S^T][L]\begin{bmatrix} y_1 \\ \vdots \\ y_m \end{bmatrix} \quad (5)$$

The penalty coefficient p is a value determined according to a device condition and the like of the flow cytometer 1. For example, when an upper limit value of a detectable range of a fluorescence intensity set in the flow cytometer 1 as the device conditions is about $10^6$, the penalty coefficient may be set to about $10^{-8}$.

The penalty term pI suppresses an autofluorescence component in a reference spectrum by multiplying a row of an autofluorescence spectrum A in a reference spectrum S by ε (0<ε<1) as illustrated in the following formula (6). Note that, in formula (6), ε is a parameter (autofluorescence correction parameter) for correcting an autofluorescence spectrum and is a regularization parameter. In addition, A' represents an autofluorescence spectrum reduced by the autofluorescence correction parameter ε.

$$A' = \varepsilon A \quad (6)$$

A value of the autofluorescence correction parameter ε may be set to a value larger than 0 and smaller than 1, for example, 0.1 or less. Roughly, the autofluorescence correction parameter ε may be determined, for example, using the following equation (7). Note that, in formula (7), L represents a weighted square error (also referred to as a weighted matrix), and A represents an autofluorescence spectrum before reduction.

$$\frac{p}{\varepsilon^2} \cong \frac{L}{A} \quad (7)$$

Figure 11:
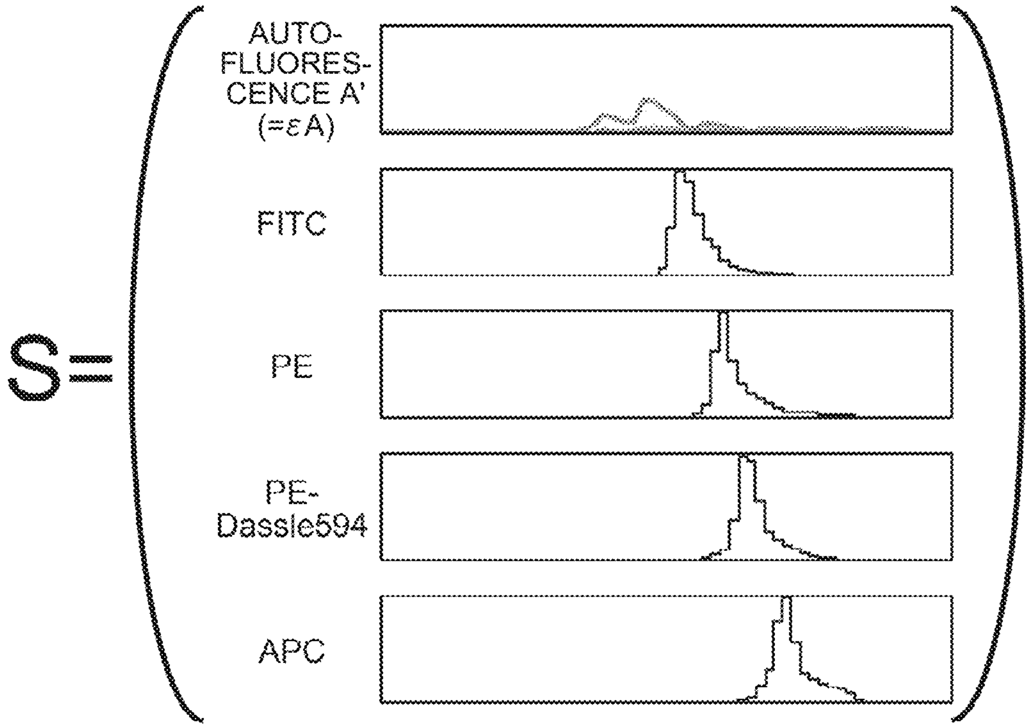
FIG. 11 is a diagram illustrating an example of a restricted reference spectrum according to the embodiment.

By reducing the autofluorescence component in the reference spectrum S with such an autofluorescence correction parameter ε, the reference spectrum S including the autofluorescence spectrum A illustrated in FIG. 7 is converted into the reference spectrum S in which the autofluorescence spectrum A is reduced to the autofluorescence spectrum A' with the autofluorescence correction parameter ε as illustrated in FIG. 11. Note that FIG. 11 is a diagram illustrating an example of a restricted reference spectrum according to the present embodiment.

In this way, by restricting the autofluorescence component in the reference spectrum S with the autofluorescence correction parameter ε, it is possible to suppress an increase in variation of the autofluorescence component. As a result, an influence of the variation of the autofluorescence component in the unmixing can be suppressed, and therefore deterioration of the fluorescence separation performance can be suppressed. That is, in the present embodiment, by setting the penalty coefficient p and the autofluorescence correction parameter ε to appropriate values, it is possible to suppress deterioration of the fluorescence separation performance even when a reference spectrum including an autofluorescence component is used.

Note that here, the case where only the autofluorescence component is restricted with the autofluorescence correction parameter ε has been exemplified, but the present embodiment is not limited thereto, and a fluorescence spectrum reference of a fluorescent dye can be restricted with the autofluorescence correction parameter ε. For example, a fluorescent dye having a small absolute amount included in a stained sample or a fluorescent dye originally having a small fluorescence intensity may be restricted with the autofluorescence correction parameter ε. However, the autofluorescence correction parameter ε in this case may be a value different from an autofluorescence correction parameter ε for another fluorescent dye and an autofluorescence.

2.7 Regarding Automatic Determination of Limited Autofluorescence Correction Parameter In the above description, the penalty coefficient p (or the penalty term pI) is a value determined according to setting of an upper limit value of a fluorescence intensity as a device condition as described above, and therefore can be automatically determined according to setting of the device. That is, in the present embodiment, for example, the data analysis unit 14 may automatically determine the penalty coefficient p on the basis of a device condition (an upper limit value of fluorescence intensity and the like) set in the flow cytometer 1.

Meanwhile, the autofluorescence correction parameter ε is an amount that requires appropriate setting for each type of sample to be measured or each set of samples (hereinafter, referred to as a sample group). However, the autofluorescence correction parameter ε can also be automatically determined by the following method.

Figure 12:
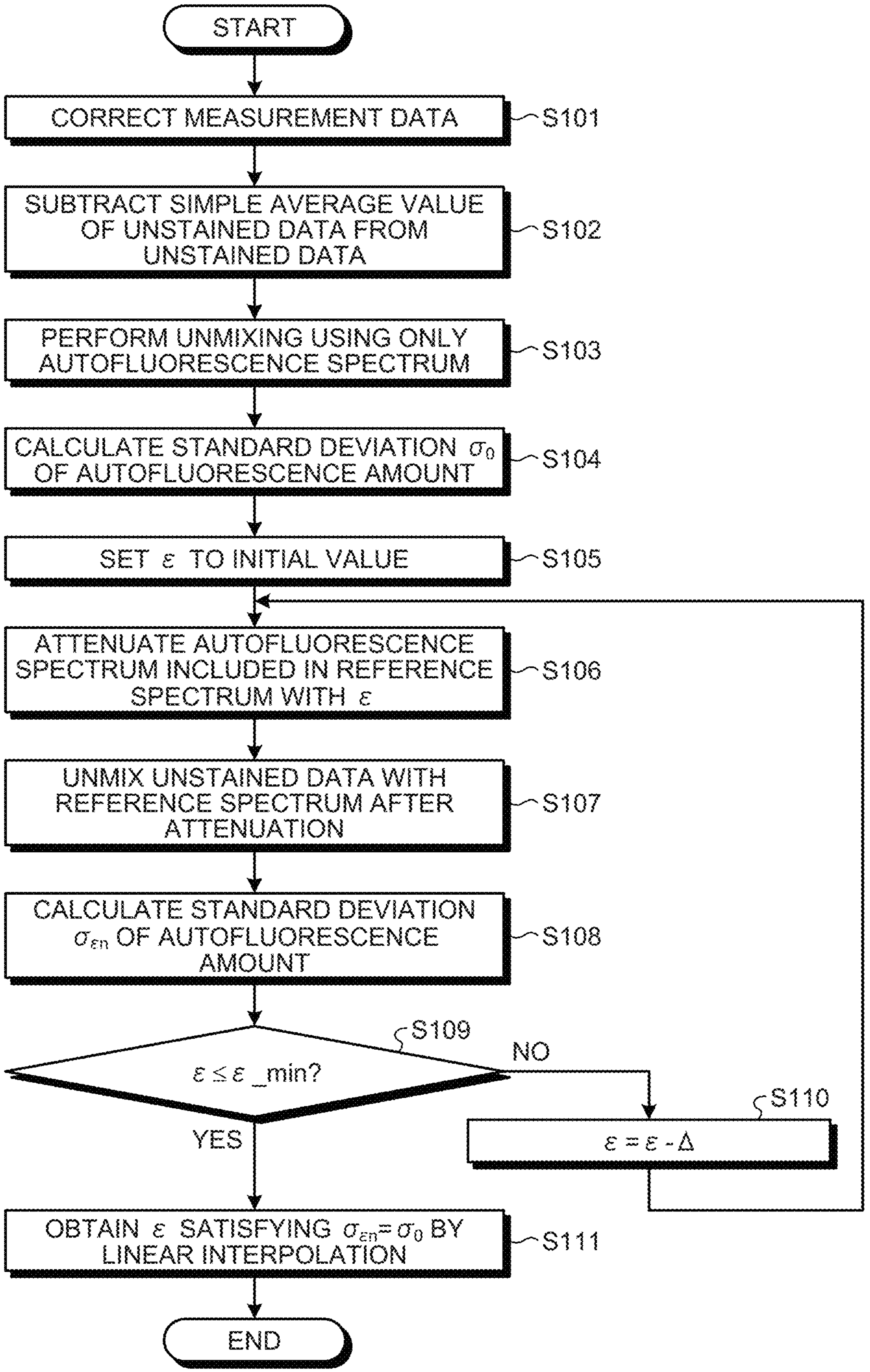
FIG. 12 is a flowchart illustrating an example of an automatic determination operation of an autofluorescence correction parameter according to the embodiment.

FIG. 12 is a flowchart illustrating an example of an automatic determination operation of an autofluorescence correction parameter according to the present embodiment. Note that this operation may be, for example, an operation executed by the data analysis unit 14. Therefore, this operation will be described below as an operation executed by the data analysis unit (determination unit) 14.

As illustrated in FIG. 12, in the present operation, first, the data analysis unit 14 executes correction of measurement data (step S101). In the correction of measurement data, in addition to the above-described fluorescence correction, for example, a process of extracting measurement data obtained from an unstained sample of the same or the same type as a stained sample to be analyzed from measurement data recorded in the data recording unit 13 is executed.

Note that the unstained data extracted in step S101 may be measurement data measured using the flow cytometer 1 every time analysis is executed, or may be unstained data recorded in the data recording unit 13 by past execution for an unstained sample of the same or the same type as a stained sample to be analyzed. The unstained sample of the same or the same type as a stained sample to be analyzed may be an unstained sample before the stained sample to be analyzed is labeled, an unstained sample of the same type (for example, the same type of cells or the like) as the stained sample to be analyzed, or the like.

Next, a simple average value of the corrected unstained data is calculated, and the calculated simple average value is subtracted from the unstained data (step S102).

Next, the data analysis unit 14 unmixes the unstained data obtained by subtracting the simple average value in step S102 using the reference spectrum S including only an autofluorescence spectrum of an unstained sample of the same or the same type as the unstained sample from which the unstained data is acquired (step S103).

Next, the data analysis unit 14 calculates a standard deviation $\sigma_0$ of the fluorescence intensity (hereinafter, also referred to as autofluorescence amount) of the autofluorescence calculated by the unmixing in step S103 (step S104). Here, since the simple average value is subtracted from the unstained data in step S102, the distribution of the autofluorescence amount obtained in step S103 is a distribution centered on zero. Therefore, in step S104, the standard deviation $\sigma_0$ centered on zero is calculated.

Next, the data analysis unit 14 sets the autofluorescence correction parameter ε to an initial value (step S105). The initial value of the autofluorescence correction parameter ε may be a value smaller than 1, such as 0.1.

Next, as illustrated in formula (6), the data analysis unit 14 attenuates the autofluorescence spectrum A included in the reference spectrum S with the autofluorescence correction parameter ε (step S106).

Next, the data analysis unit 14 unmixes the unstained data obtained by subtracting the simple average value in step S102 with the reference spectrum S in which the autofluorescence spectrum A is attenuated with the autofluorescence correction parameter ε (step S107). Note that, in step S107, since an object to be unmixed is unstained data, the fluorescence amount obtained as a result of the unmixing is an autofluorescence amount.

Next, the data analysis unit 14 calculates a standard deviation $\sigma_{0n}$ of the autofluorescence amount calculated by the unmixing in step S107 (step S108). Note that, as in step S104, since the simple average value is subtracted from the unstained data in step S102, the distribution of the autofluorescence amount obtained in step S107 is a distribution centered on zero. Therefore, in step S108, a standard deviation $\sigma_{\varepsilon n}$ centered on zero is calculated.

Next, the data analysis unit 14 determines whether or not the autofluorescence correction parameter ε is equal to or less than a preset minimum value ε_min of the autofluorescence correction parameter ε (step S109). If the autofluorescence correction parameter ε is larger than the minimum value ε_min (NO in step S109), the data analysis unit 14 decreases the autofluorescence correction parameter ε by a predetermined width Δ (step S110), then returns to step S106, and executes subsequent operations. Note that the predetermined width Δ may be, for example, a value sufficiently smaller than 1, such as 0.01 or 0.005.

Meanwhile, if the autofluorescence correction parameter ε has reached the minimum value ε_min or less (YES in step S109), the data analysis unit 14 linearly interpolates the standard deviation $\sigma_{\varepsilon n}$ for each autofluorescence correction parameter ε calculated by repeating steps S106 to S110 to obtain an optimal value of the autofluorescence correction parameter ε, for example, an autofluorescence correction parameter ε satisfying $\sigma_{\varepsilon n}=\sigma_0$ (step S111), and ends the present operation.

Note that, in the operation described above, the case where the standard deviation $\sigma_{\varepsilon n}$ is specified at an interval of the preset predetermined width Δ, the standard deviation $\sigma_{\varepsilon n}$ obtained by each autofluorescence correction parameter ε is linearly interpolated, and the standard deviation $\sigma_{\varepsilon n}$ and the standard deviation $\sigma_0$ thereby coincide with each other has been exemplified. However, the present disclosure is not limited thereto. However, when the standard deviation $\sigma_{\varepsilon n}$ is smaller than or larger than the standard deviation $\sigma_0$, a ratio of an autofluorescence amount indicated by the corrected autofluorescence spectrum A' to another fluorescence spectrum reference deviates from a ratio of an autofluorescence component included in measurement data to a fluorescence spectrum of another fluorescent dye, and there is a possibility that deterioration of the fluorescence separation performance cannot be suppressed. Therefore, the standard deviation $\sigma_{\varepsilon n}$ desirably coincides with the standard deviation $\sigma_0$ to some extent.

As described above, by determining an optimum autofluorescence correction parameter ε from a result of unmixing unstained data with a reference spectrum S including only an autofluorescence spectrum and a reference spectrum S including an autofluorescence spectrum and a fluorescence spectrum reference, it is possible to determine an optimal value of the autofluorescence correction parameter ε by using information (unstained data and an autofluorescence spectrum) usually measured in analysis using the flow cytometer 1. Therefore, it is possible to execute appropriate analysis without increasing a load on a user.

2.8 Action and Effect

As described above, according to the present embodiment, since the autofluorescence component in the reference spectrum S is restricted with the autofluorescence correction parameter ε, it is possible to suppress an increase in variation of the autofluorescence component. As a result, an influence of the variation of the autofluorescence component in the unmixing can be suppressed, and therefore deterioration of the fluorescence separation performance can be suppressed. That is, in the present embodiment, by setting the penalty coefficient p and the autofluorescence correction parameter ε to appropriate values, it is possible to suppress deterioration of the fluorescence separation performance even when a reference spectrum including an autofluorescence component is used.

FIGS. 13 A, 13B, 13C, 13D, 14A, 14B, 14C, 14D, 15A, 15B, 15C, and 15D are diagrams for explaining a change in fluorescence separation performance when the autofluorescence correction parameter ε according to the present embodiment is changed. FIGS. 13A, 13B, 13C, and 13D illustrate a case where the autofluorescence correction parameter ε is 1, that is, the autofluorescence component in the reference spectrum S is not reduced (not limited), FIGS. 14A, 14B, 14C, and 14D illustrate a case where the autofluorescence correction parameter ε is 0.1, and FIGS. 15A, 15B, 15C, and 15D illustrate a case where the autofluorescence correction parameter ε is 0.025.

Figure 13A:
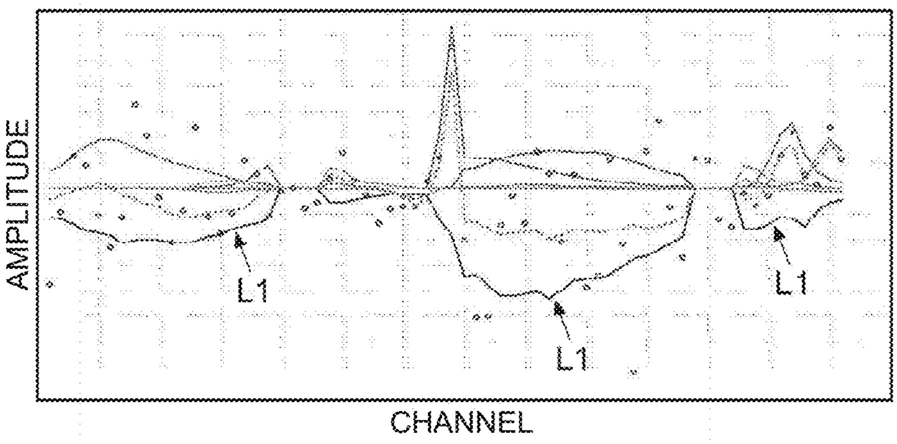
FIGS. 13A, 13B, 13C, and 13D are diagrams for explaining a change in fluorescence separation performance when an autofluorescence correction parameter ε according to the embodiment is changed (part 1).
Figure 13B:
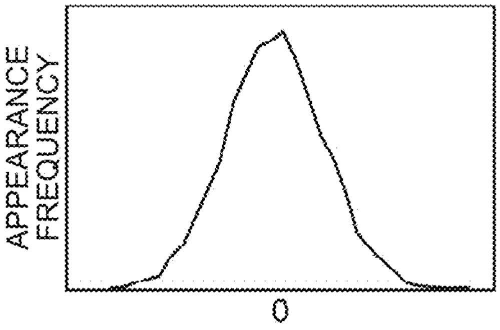
Figure 13C:
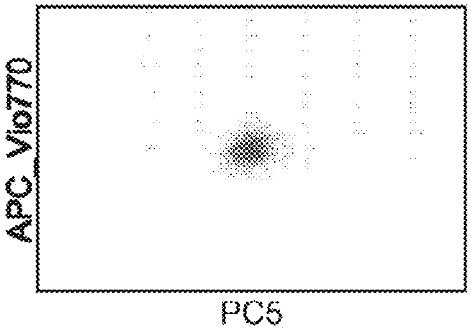
Figure 13D:
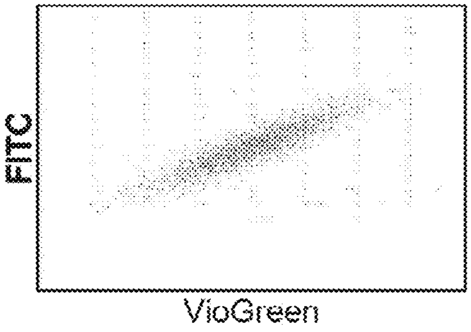
Figure 14A:
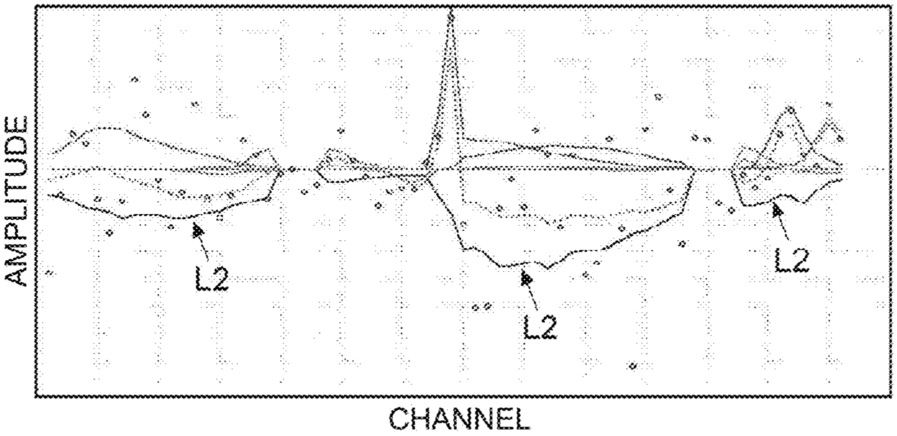
FIGS. 14A, 14B, 14C, and 14D are diagrams for explaining a change in fluorescence separation performance when the autofluorescence correction parameter ε according to the embodiment is changed (part 2).
Figure 14B:
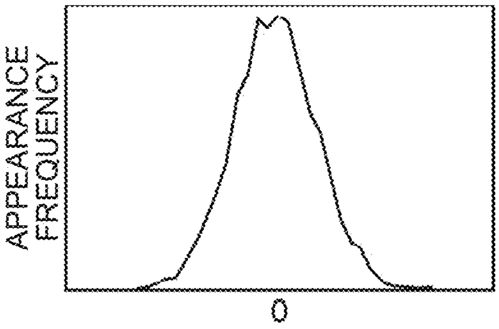
Figure 14C:
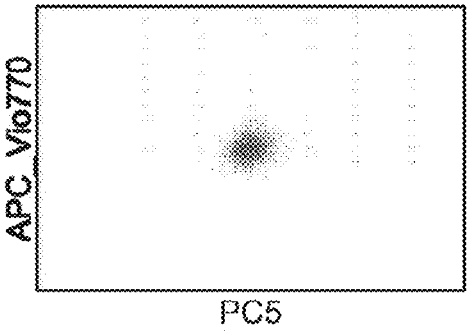
Figure 14D:
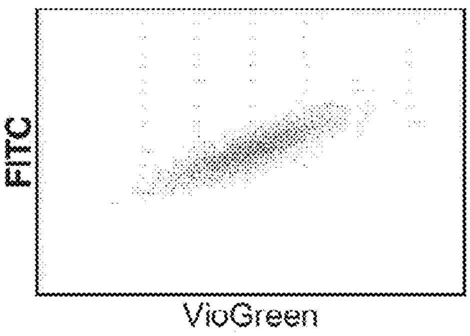
Figure 15A:
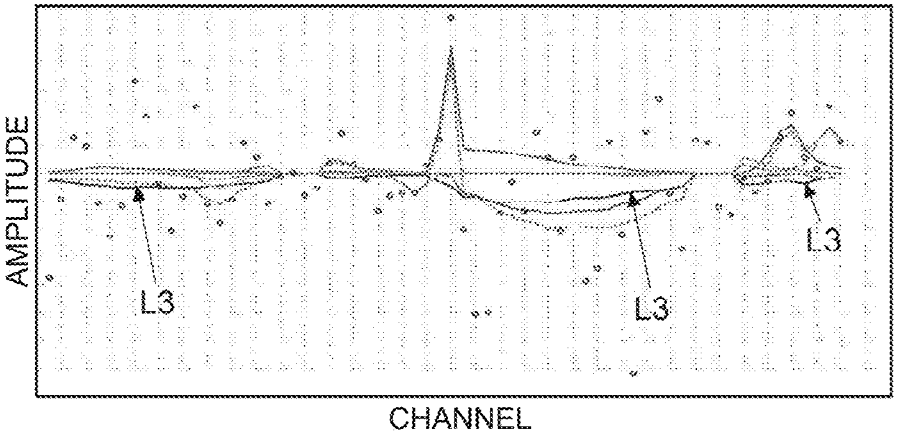
FIGS. 15A, 15B, 15C, and 15D are diagrams for explaining a change in fluorescence separation performance when the autofluorescence correction parameter ¿ according to the embodiment is changed (part 3).
Figure 15B:
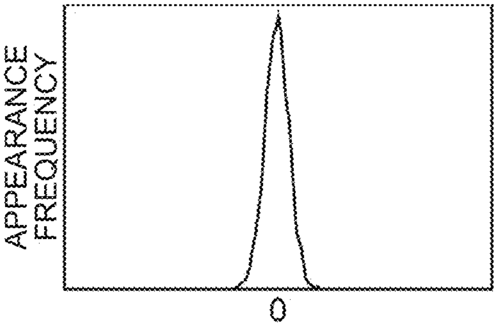
Figure 15C:
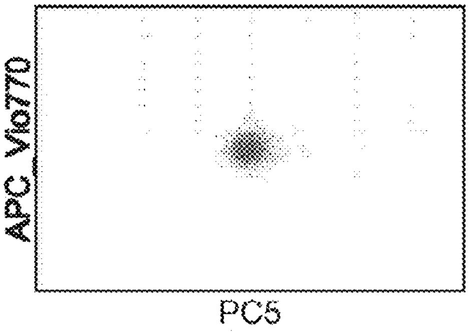
Figure 15D:
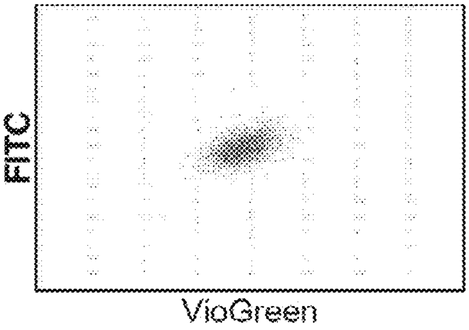

Note that, in FIGS. 13 A, 13B, 13C, 13D, 14A, 14B, 14C, 14D, 15A, 15B, 15C, and 15D, FIGS. 13A, 14A, and 15A illustrate a fluorescence spectrum of each fluorescent dye and an autofluorescence spectrum obtained by unmixing measurement data with the reference spectrum S, FIGS. 13B, 14B, and 15B illustrate a standard deviation $\sigma_\varepsilon$ of an autofluorescence amount obtained by unmixing unstained data with the reference spectrum S, FIGS. 13C, 14C, and 15C illustrate a two-dimensional plot of APC_Vio770 and PC5 (PE-Cy5), which are fluorescent dyes to be separated, and FIGS. 13D, 14D, and 15D illustrate a two-dimensional plot of FITC and VioGreen, which are fluorescent dyes to be separated.

In FIGS. 13 A, 14A, and 15A, outlined plots indicate measurement data, and solid lines and broken lines indicate fluorescence spectrum references (including an autofluorescence spectrum). Note that, among the fluorescence spectrum references, L1 to L3 are autofluorescence spectra.

As can be seen from FIGS. 13 A, 13B, 13C, 13D, 14A, 14B, 14C 14D, 15A, 15B, 15C, and 15D, when the autofluorescence correction parameter ε is set to 0.025 (FIGS. 15A, 15B, 15C, and 15D), in particular, a spread of the variation between FITC and VioGreen (see FIGS. 13D, 14D, and 15D of each drawing) is also small. This indicates that the fluorescence separation performance is improved when the autofluorescence correction parameter ε is set to 0.025 than when the autofluorescence correction parameter ε is set to 1 or 0.1.

In addition, in the present embodiment, an optimum autofluorescence correction parameter ε is determined from a result of unmixing unstained data with a reference spectrum S including only an autofluorescence spectrum and a reference spectrum S including an autofluorescence spectrum and a fluorescence spectrum reference. Therefore, it is possible to determine an optimal value of the autofluorescence correction parameter ε by using information (unstained data and an autofluorescence spectrum) usually measured in analysis using the flow cytometer 1. Therefore, it is possible to execute appropriate analysis without increasing a load on a user.

Figure 16A:
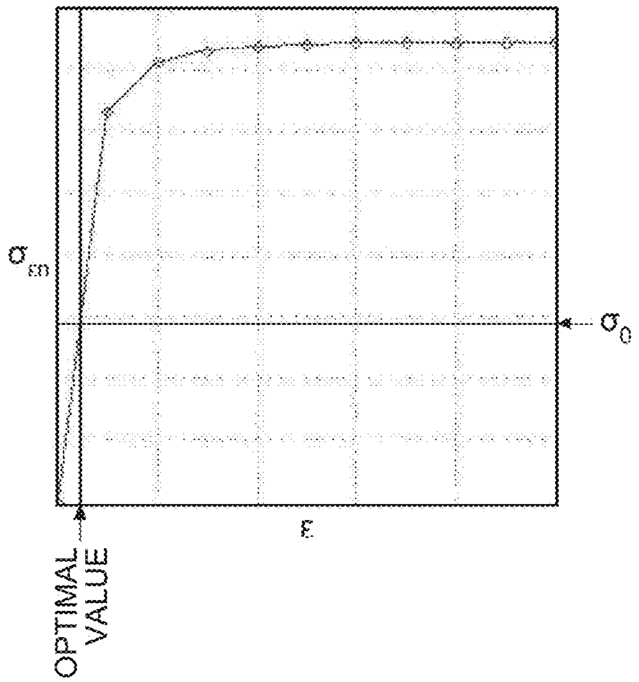
FIGS. 16A and 16B are graphs illustrating a change in a standard deviation of an autofluorescence amount obtained from an unstained when the sample autofluorescence correction parameter ε is changed with different predetermined widths 4.
Figure 16B:
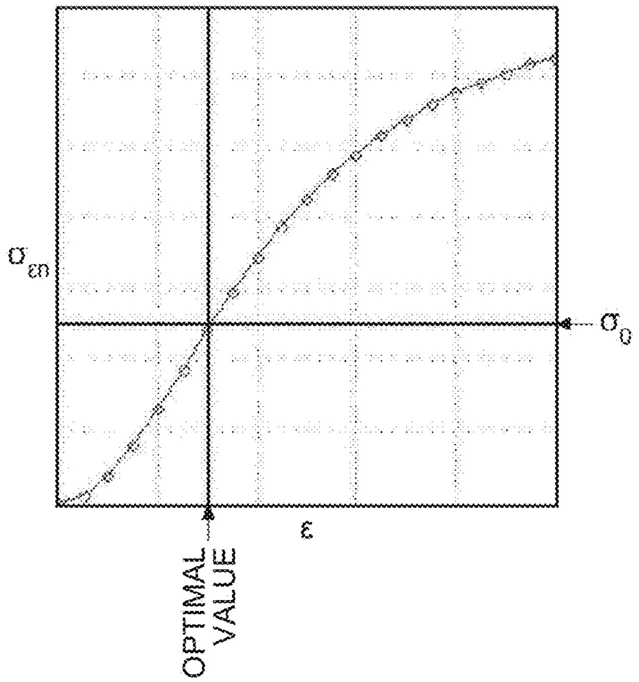

FIGS. 16A and 16B are graphs illustrating a change in a standard deviation of an autofluorescence amount obtained from an unstained sample when an autofluorescence correction parameter ε is changed with a different predetermined width Δ, in which FIG. 16A indicates a change in standard deviation in a range of 0 to 1 when the predetermined width Δ is 0.1, and FIG. 16B indicates a standard change in a range of 0 to 0.1 when the predetermined width Δ is 0.005. As illustrated in FIGS. 16A and 16B, it can be seen that when the predetermined width Δ is set to a small value, that is, when the autofluorescence correction parameter ε is changed more finely (see FIG. 16B), it is possible to obtain a more optimum autofluorescence correction parameter ε close to the standard deviation $\sigma_0$ than when the predetermined width Δ is set to a large value (see FIG. 16A).

In addition, FIGS. 17A, 17B, 17C, 17D, 17E, 17F, 17G, 17H, 17I, 17J, 17K, 17L, and 17M are diagrams illustrating fluorescence separation performance when a penalty term is not provided an autofluorescence spectrum is not limited and fluorescence separation performance when the penalty term is provided and the autofluorescence spectrum is limited (the present embodiment). In FIGS. 17A, 17B, 17C, 17D, 17E, 17F, 17G, 17H, 17I, 17J, 17K, 17L, and 17M, FIG. 17A illustrates a variation (standard deviation $\sigma_0$) in an autofluorescence amount when unstained data is unmixed with a reference spectrum including only an autofluorescence spectrum, FIG. 17B illustrates a variation (standard deviation $\sigma_{\varepsilon n}$) in an autofluorescence amount when unstained data is unmixed with a reference spectrum including an unlimited autofluorescence spectrum and a fluorescence spectrum reference, and FIG. 17H illustrates a variation (standard deviation Gen) in an autofluorescence amount when unstained data is unmixed with a reference spectrum including a limited autofluorescence spectrum and a fluorescence spectrum reference.

Figure 17:
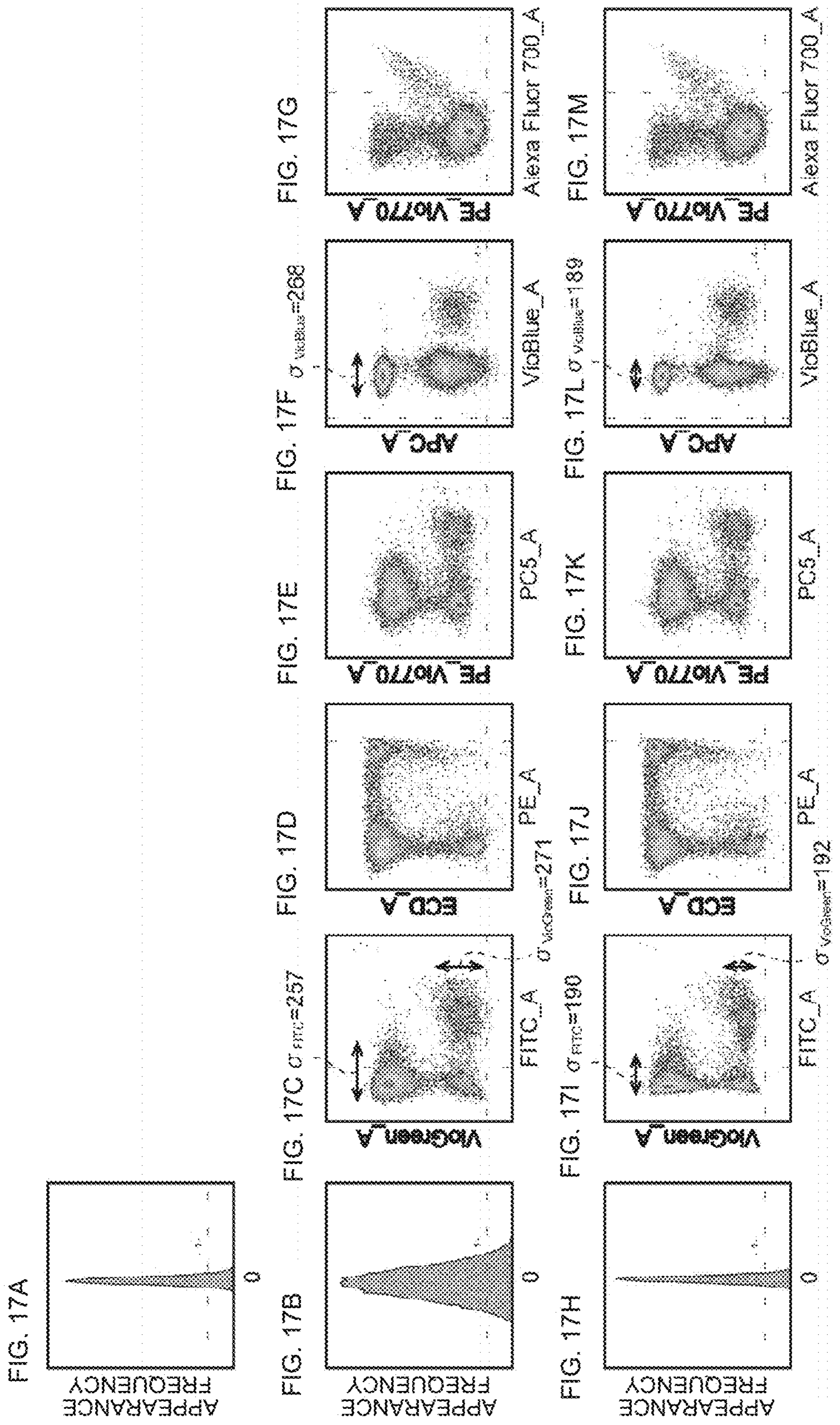
FIGS. 17A, 17B, 17C, 17D, 17E, 17F, 17G, 17H, 17I, 17J, 17K, 17L, and 17M are diagrams illustrating fluorescence separation performance when a penalty term is not provided and an autofluorescence spectrum is not limited and fluorescence separation performance when the penalty term is provided and the autofluorescence spectrum is limited (embodiment).

In addition, FIGS. 17C, 17D, 17E, 17F, and 17G are each a two-dimensional plot illustrating fluorescence separation performance when unstained data is unmixed with the reference spectrum including an unlimited autofluorescence spectrum and a fluorescence spectrum reference illustrated in FIG. 17B, and FIGS. 17I, 17J, 17K, 17L, and 17M are each a two-dimensional plot illustrating fluorescence separation performance when unstained data is unmixed with the reference spectrum including a limited autofluorescence spectrum and a fluorescence spectrum reference illustrated in FIG. 17H.

Note that, in FIGS. 17H, 17I, 17J, 17K, 17L, and 17M, the penalty coefficient p is $10^{-7}$, and the autofluorescence correction parameter ε is 0.005.

As can be seen by referring in FIGS. 17C, 17D. 17E, 17F, 17G, 17I, 17J, 17K, 17L and 17M, the fluorescence separation performance of the unmixing is improved by providing the penalty term pl and limiting the autofluorescence spectrum in the reference spectrum S as in the present embodiment.

For example, as illustrated in FIGS. 17C and 17I, in a relationship between FiTC and VioGreen, when a penalty term is not provided an autofluorescence spectrum is not limited (see FIG. 17C), a standard deviation $\sigma_{FITC}$ of FITC is 257 and a standard deviation $\sigma_{VioGreen}$ of VioGreen is 271. On the other hand, when the penalty term is provided and the autofluorescence spectrum is limited (see FIG. 17I), the standard deviation $\sigma_{FITC}$ of FITC is 190, and the standard deviation $\sigma_{VioGreen}$ of VioGreen is 192. That is, the fluorescence separation performance is improved by 26% for FITC and by 30% for VioGreen.

In addition, as illustrated in FIGS. 17F and 17L, in a relationship between VioBlue and APC, when a penalty term is not provided and an autofluorescence spectrum is not limited (see FIG. 17F), a standard deviation $\sigma_{VioBlue}$ of VioBlue is 268. On the other hand, when the penalty term is provided and the autofluorescence spectrum is limited (see FIG. 17L), the standard deviation OVioBlue of VioBlue is 189. That is, the fluorescence separation performance is improved by 30%.

Hitherto, the preferred embodiment of the present disclosure has been described in detail with reference to the attached drawings. However, the technical scope of the present disclosure is not limited to such an example. It is obvious that a person having ordinary knowledge in the technical field of the present disclosure can conceive various change examples or modification examples within the scope of the technical idea described in the claims, and it is naturally understood that these also belong to the technical scope of the present disclosure.

In addition, the effects described in the present specification are merely illustrative or exemplary, and are not restrictive. That is, the technology according to the present disclosure can exhibit other effects obvious to those skilled in the art from the description of the present specification together with or instead of the above effects.

Note that the following configurations also belong to the technical scope of the present disclosure.

(1)

An information processing device comprising a separation unit that calculates, from a fluorescence signal measured from a biological sample labeled with one or more fluorescent dyes, fluorescence intensities of one or more fluorescent beams and an autofluorescent beam emitted from the one or more fluorescent dyes and the biological sample, respectively, by an arithmetic operation using a least squares method using a fluorescence spectrum reference of each of the fluorescent dyes and an autofluorescence spectrum of the biological sample, wherein in the arithmetic operation using the least squares method, an upper limit value and a lower limit value of the fluorescence intensity are set for each of the one or more fluorescent beams and the autofluorescent beam.

(2)

The information processing device according to (1), wherein the separation unit calculates the fluorescence intensities of the fluorescent beams and the autofluorescent beam emitted from the one or more fluorescent dyes and the biological sample, respectively, by an arithmetic formula including a penalty term that sets the upper limit value and the lower limit value of the fluorescence intensity for each of the one or more fluorescent dyes and the biological sample.

(3)

The information processing device according to (2), wherein the arithmetic formula is expressed by the following formula (1):

$$\begin{bmatrix} x_1 \\ \vdots \\ x_n \end{bmatrix} = \left([S^T][L][S] + p[I]\right)^{-1}[S^T][L]\begin{bmatrix} y_1 \\ \vdots \\ y_m \end{bmatrix} \quad (8)$$

in which $x_i$ (i is an integer of 1 or more) represents a fluorescence intensity of each of the one or more fluorescent beams and the autofluorescent beam, $y_j$ (j is an integer of 1 or more) represents the fluorescence signal, S represents a reference spectrum including a fluorescence spectrum reference of each of the fluorescent dyes and an autofluorescence spectrum of the biological sample, $S^T$ represents a transposed matrix of the reference spectrum S, L represents a weighting coefficient matrix, p represents a penalty coefficient, I represents a unit matrix, and pI represents the penalty term.

(4)

The information processing device according to any one of (1) to (3), wherein in the arithmetic operation using the least squares method, the upper limit value and the lower limit value set for at least one of the one or more fluorescent beams and the autofluorescent beam are different from the upper limit value and the lower limit value set for another one of the one or more fluorescent beams and the autofluorescent beam, respectively.

(5)

The information processing device according to (4), wherein the at least one of the one or more fluorescent beams and the autofluorescent beam is the autofluorescent beam.

(6)

The information processing device according to (2) or (3), wherein the arithmetic formula includes an autofluorescence correction parameter for setting the different upper limit values between at least one of the one or more fluorescent beams and the autofluorescent beam and another one of the one or more fluorescent beams and the autofluorescent beam.

(7)

The information processing device according to (3), wherein at least one of the one or more fluorescence spectrum references and the autofluorescence spectrum included in the reference spectrum S is reduced with an autofluorescence correction parameter having a value larger than 0 and smaller than 1.

(8)

The information processing device according to (6) or (7), further comprising a determination unit that determines the autofluorescence correction parameter, wherein the determination unit calculates a first standard deviation of a fluorescence intensity of an autofluorescent beam emitted from an unstained biological sample by executing the arithmetic operation using the least squares method using the autofluorescence spectrum on a fluorescence signal measured from the unstained biological sample, calculates a second standard deviation of the fluorescence intensity of the autofluorescent beam emitted from the unstained biological sample by executing the arithmetic operation using the least squares method using the fluorescence spectrum reference of each of the fluorescent dyes and the autofluorescence spectrum on the fluorescence signal measured from the unstained biological sample, and determines the autofluorescence correction parameter such that the second standard deviation coincides with or approximates the first standard deviation.

(9)

The information processing device according to any one of (1) to (8), wherein the least squares method is a weighted least squares method.

(10)

An information processing method comprising calculating, from a fluorescence signal measured from a biological sample labeled with one or more fluorescent dyes, fluorescence intensities of one or more fluorescent beams and an autofluorescent beam emitted from the one or more fluorescent dyes and the biological sample, respectively, by an arithmetic operation using a least squares method using a fluorescence spectrum reference of each of the fluorescent dyes and an autofluorescence spectrum of the biological sample, wherein in the arithmetic operation using the least squares method, an upper limit value and a lower limit value of the fluorescence intensity are set for each of the one or more fluorescent beams and the autofluorescent beam.

(11)

A program for causing a computer to function for analyzing a biological sample labeled with one or more fluorescent dyes, wherein the program causes the computer to execute processing of calculating, from a fluorescence signal measured from the biological sample, fluorescence intensities of one or more fluorescent beams and an autofluorescent beam emitted from the one or more fluorescent dyes and the biological sample, respectively, by an arithmetic operation using a least squares method using a fluorescence spectrum reference of each of the fluorescent dyes and an autofluorescence spectrum of the biological sample, and in the arithmetic operation using the least squares method, an upper limit value and a lower limit value of the fluorescence intensity are set for each of the one or more fluorescent beams and the autofluorescent beam.

(12)

An optical measurement system comprising:

an excitation light source that irradiates a biological sample labeled with one or more fluorescent dyes with one or more excitation beams;

a detection unit that detects fluorescence signals of a fluorescent beam and an autofluorescence emitted from the biological sample by the irradiation of the one or more excitation beams; and a separation unit that calculates, from the fluorescence signals detected by the detection unit, fluorescence intensities of one or more fluorescent beams and an autofluorescent beam emitted from the one or more fluorescent dyes and the biological sample, respectively, by an arithmetic operation using a least squares method using a fluorescence spectrum reference of each of the fluorescent dyes and an autofluorescence spectrum of the biological sample, wherein in the arithmetic operation using the least squares method, an upper limit value and a lower limit value of the fluorescence intensity are set for each of the one or more fluorescent beams and the autofluorescent beam.

REFERENCE SIGNS LIST

1 FLOW CYTOMETER
10 INFORMATION PROCESSING SYSTEM
11 DEVICE CONTROL UNIT
12 FLUORESCENCE SPECTRUM DETECTION UNIT
13 DATA RECORDING UNIT
14 DATA ANALYSIS UNIT
100 LIGHT SOURCE UNIT
101 to 103 EXCITATION LIGHT SOURCE
111, 115 TOTAL REFLECTION MIRROR
112, 113 DICHROIC MIRROR
116 OBJECTIVE LENS
120 MICROCHIP
123*a* SPOT
130 SCATTERED LIGHT DETECTION UNIT
131, 133, 135 LENS
134 MASK
136 PHOTODETECTOR
137 DIAPHRAGM
140 FLUORESCENCE DETECTION UNIT
141 SPECTROSCOPIC OPTICAL SYSTEM
141*a* OPTICAL ELEMENT
142 PHOTODETECTOR
150 DEMULTIPLEXING OPTICAL SYSTEM
151 FILTER
152 COLLIMATOR LENS
153 DICHROIC MIRROR
154 TOTAL REFLECTION MIRROR
L1, L2, L3 EXCITATION BEAM
L11 BEAM
L12 FORWARD SCATTERED BEAM
L13 FLUORESCENT BEAM
L14 DISPERSED BEAM

The invention claimed is:

1. An information processing device, comprising a processor configured to calculate, from a fluorescence signal measured from a biological sample labeled with one or more fluorescent dyes, a fluorescence intensity of:

each of one or more fluorescent beams emitted from the one or more fluorescent dyes, and an autofluorescent beam emitted from the biological sample, wherein the calculation of the fluorescence intensity is by an arithmetic operation using a least squares method, the least squares method uses a fluorescence spectrum reference of each of the one or more fluorescent dyes, and an autofluorescence spectrum of the biological sample, the least squares method uses an arithmetic formula including a penalty term, the arithmetic formula is expressed by the following formula (1):

$$\begin{bmatrix} x_1 \\ \vdots \\ x_n \end{bmatrix} = ([S^T][L][S] + p[I])^{-1}[S^T][L]\begin{bmatrix} y_1 \\ \vdots \\ y_m \end{bmatrix} \quad (1)$$

in which $x_i$ (i is an integer of 1 or more) represents the fluorescence intensity of the each of the one or more fluorescent beams and the autofluorescent beam, $y_j$ (j is an integer of 1 or more) represents the fluorescence signal, S represents a reference spectrum including the fluorescence spectrum reference of the each of the one or more fluorescent dyes and the autofluorescence spectrum of the biological sample, $S^T$ represents a transposed matrix of the reference spectrum S, L represents a weighting coefficient matrix, p represents a penalty coefficient, represents a unit matrix, and pl represents the penalty term, and the penalty term sets an upper limit value and a lower limit value of the fluorescence intensity for the each of the one or more fluorescent beams and the autofluorescent beam.

2. The information processing device according to claim 1, wherein in the arithmetic operation using the least squares method, the upper limit value and the lower limit value set for at least one of the one or more fluorescent beams and the autofluorescent beam are different from the upper limit value and the lower limit value set for a different one of the one or more fluorescent beams and the autofluorescent beam, respectively.

3. The information processing device according to claim 2, wherein the at least one of the one or more fluorescent beams and the autofluorescent beam is the autofluorescent beam.

4. The information processing device according to claim 1, wherein the arithmetic formula further includes an autofluorescence correction parameter to set different upper limit values between at least one of the one or more fluorescent beams and the autofluorescent beam and a different one of the one or more fluorescent beams and the autofluorescent beam.

5. The information processing device according to claim 1, wherein at least one of the fluorescence spectrum reference and the autofluorescence spectrum included in the reference spectrum S is reduced with an autofluorescence correction parameter having a value larger than 0 and smaller than 1.

6. The information processing device according to claim 4, wherein the processor is further configured to:

calculate a first standard deviation of a fluorescence intensity of an autofluorescent beam emitted from an unstained biological sample, wherein the first standard deviation is calculated by execution of the arithmetic operation using the least squares method using the autofluorescence spectrum on a fluorescence signal measured from the unstained biological sample;

calculate a second standard deviation of the fluorescence intensity of the autofluorescent beam emitted from the unstained biological sample, wherein the second standard deviation is calculated by execution of the arithmetic operation using the least squares method using the fluorescence spectrum reference of the each of the one or more fluorescent dyes and the autofluorescence spectrum on the fluorescence signal measured from the unstained biological sample; and determine the autofluorescence correction parameter such that the second standard deviation coincides with or approximates the first standard deviation.

7. The information processing device according to claim 1, wherein the least squares method is a weighted least squares method.

8. An information processing method, comprising:

calculating, from a fluorescence signal measured from a biological sample labeled with one or more fluorescent dyes, a fluorescence intensity of:

each of one or more fluorescent beams emitted from the one or more fluorescent dyes, and an autofluorescent beam emitted from the biological sample, wherein the calculation of the fluorescence intensity is by an arithmetic operation using a least squares method, the least squares method uses a fluorescence spectrum reference of each of the one or more fluorescent dyes, and an autofluorescence spectrum of the biological sample, the least squares method uses an arithmetic formula including a penalty term, the arithmetic formula is expressed by the following formula (1):

$$\begin{bmatrix} x_1 \\ \vdots \\ x_n \end{bmatrix} = ([S^T][L][S] + p[I])^{-1}[S^T][L]\begin{bmatrix} y_1 \\ \vdots \\ y_m \end{bmatrix} \quad (1)$$

in which $x_i$ (i is an integer of 1 or more) represents the fluorescence intensity of the each of the one or more fluorescent beams and the autofluorescent beam, $y_j$ (j is an integer of 1 or more) represents the fluorescence signal, S represents a reference spectrum including the fluorescence spectrum reference of the each of the one or more fluorescent dyes and the autofluorescence spectrum of the biological sample, $S^T$ represents a transposed matrix of the reference spectrum S, L represents a weighting coefficient matrix, p represents a penalty coefficient, represents a unit matrix, and pl represents the penalty term, and the penalty term sets an upper limit value and a lower limit value of the fluorescence intensity for the each of the one or more fluorescent beams and the autofluorescent beam.

9. A non-transitory computer-readable medium having stored thereon computer-executable instructions, which when executed by a computer, cause the computer to execute operations, the operations comprising:

analyzing a biological sample labeled with one or more fluorescent dyes; and calculating, from a fluorescence signal measured from the biological sample, a fluorescence intensity of:

each of one or more fluorescent beams emitted from the one or more fluorescent dyes, and an autofluorescent beam emitted from the biological sample, wherein the calculation of the fluorescence intensity is by an arithmetic operation using a least squares method, the least squares method uses a fluorescence spectrum reference of each of the one or more fluorescent dyes, and an autofluorescence spectrum of the biological sample, the least squares method uses an arithmetic formula including a penalty term, the arithmetic formula is expressed by the following formula (1):

$$\begin{bmatrix} x_1 \\ \vdots \\ x_n \end{bmatrix} = \left([S^T][L][S] + p[I]\right)^{-1}[S^T][L]\begin{bmatrix} y_1 \\ \vdots \\ y_m \end{bmatrix} \quad (1)$$

in which $x_i$ (i is an integer of 1 or more) represents the fluorescence intensity of the each of the one or more fluorescent beams and the autofluorescent beam, $y_j$ (j is an integer of 1 or more) represents the fluorescence signal, S represents a reference spectrum including the fluorescence spectrum reference of the each of the one or more fluorescent dyes and the autofluorescence spectrum of the biological sample, $S^T$ represents a transposed matrix of the reference spectrum S, L represents a weighting coefficient matrix, p represents a penalty coefficient, I represents a unit matrix, and pI represents the penalty term, and the penalty term sets an upper limit value and a lower limit value of the fluorescence intensity for the each of the one or more fluorescent beams and the autofluorescent beam.

10. An optical measurement system, comprising:

an excitation light source configured to irradiate a biological sample labeled with one or more fluorescent dyes with one or more excitation beams;

a photodetector configured to detect fluorescence signals of a fluorescent beam and an autofluorescence emitted from the biological sample by the irradiation of the one or more excitation beams; and a processor configured to calculate, from the detected fluorescence signals, a fluorescence intensity of:

each of one or more fluorescent beams emitted from the one or more fluorescent dyes, and an autofluorescent beam emitted from the biological sample, wherein the calculation of the fluorescence intensity is by an arithmetic operation using a least squares method, the least squares method uses a fluorescence spectrum reference of each of the one or more fluorescent dyes, and an autofluorescence spectrum of the biological sample, the least squares method uses an arithmetic formula including a penalty term, wherein the arithmetic formula is expressed by the following formula (1):

$$\begin{bmatrix} x_1 \\ \vdots \\ x_n \end{bmatrix} = \left([S^T][L][S] + p[I]\right)^{-1}[S^T][L]\begin{bmatrix} y_1 \\ \vdots \\ y_m \end{bmatrix} \quad (1)$$

in which $x_i$ (i is an integer of 1 or more) represents the fluorescence intensity of the each of the one or more fluorescent beams and the autofluorescent beam, $y_j$ (j is an integer of 1 or more) represents at least one fluorescence signal of the fluorescence signals, S represents a reference spectrum including the fluorescence spectrum reference of the each of the one or more fluorescent dyes and the autofluorescence spectrum of the biological sample, $S^T$ represents a transposed matrix of the reference spectrum S, L represents a weighting coefficient matrix, p represents a penalty coefficient, I represents a unit matrix, and pI represents the penalty term, and the penalty term sets an upper limit value and a lower limit value of the fluorescence intensity for the each of the one or more fluorescent beams and the autofluorescent beam.

* * * * *